United States Patent
Aihara et al.

(10) Patent No.: US 12,000,738 B2
(45) Date of Patent: Jun. 4, 2024

(54) LOAD SENSOR

(71) Applicant: Panasonic Intellectual Property Management Co., Ltd., Osaka (JP)

(72) Inventors: Yui Aihara, Osaka (JP); Susumu Uragami, Osaka (JP); Yuta Moriura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 306 days.

(21) Appl. No.: 17/671,346

(22) Filed: Feb. 14, 2022

(65) Prior Publication Data

US 2022/0163414 A1  May 26, 2022

Related U.S. Application Data

(63) Continuation of application No. PCT/JP2020/025549, filed on Jun. 29, 2020.

(30) Foreign Application Priority Data

Aug. 27, 2019 (JP) .................................. 2019-155076

(51) Int. Cl.
*G01L 1/14* (2006.01)
(52) U.S. Cl.
CPC .................... *G01L 1/146* (2013.01)
(58) Field of Classification Search
CPC . G01B 7/00; G01B 7/28; H01H 13/14; H01H 13/20; G06F 3/03; G06F 3/0445; G06F 3/0412; G06F 3/04166; G06F 3/03547; G06F 3/0443; G06F 3/0202; G06F 3/0448; G06F 3/03545; G06F 3/0447; G06F 3/02; G01L 1/146; G01L 1/14; (Continued)

(56) References Cited

U.S. PATENT DOCUMENTS

| 4,986,136 A | 1/1991 | Brunner et al. |
| 2013/0234734 A1* | 9/2013 | Iida ........................ G01L 1/146 |
| | | 324/661 |

(Continued)

FOREIGN PATENT DOCUMENTS

| CN | 101901089 A | 12/2010 |
| CN | 104599878 A | 5/2015 |

(Continued)

OTHER PUBLICATIONS

First Office Action received in corresponding Chinese Patent Application No. 202080057769.0, dated Nov. 28, 2023.
(Continued)

*Primary Examiner* — Brandi N Hopkins
(74) *Attorney, Agent, or Firm* — Rimon P.C.

(57) ABSTRACT

A load sensor includes: an electrode; a dielectric formed on a lower surface of the electrode; and a conductive elastic body disposed so as to face a lower surface of the dielectric and having conductivity. A plurality of projecting portions are formed on an upper surface of the conductive elastic body. The conductive elastic body has a bending shape that is bent in an up-down direction, in at least a part thereof. Alternatively, at least either the conductive elastic body or the electrode has a bending shape that is bent in an up-down direction, in at least a part thereof.

20 Claims, 18 Drawing Sheets

(58) Field of Classification Search
CPC ......... G01L 1/142; G01L 1/144; G01L 1/148;
G01L 9/0073; H01G 5/16; A61B
5/02444; H03K 17/955
See application file for complete search history.

(56) References Cited

U.S. PATENT DOCUMENTS

| | | |
|---|---|---|
| 2014/0202259 A1* | 7/2014 | Ikebe ................ G06F 3/04144 |
| | | 73/862.041 |
| 2015/0114814 A1 | 4/2015 | Suzuki et al. |
| 2016/0026259 A1 | 1/2016 | Takahashi |
| 2016/0273987 A1* | 9/2016 | Masuda ................ G01L 9/0073 |
| 2020/0018656 A1 | 1/2020 | Sawada et al. |

FOREIGN PATENT DOCUMENTS

| | | |
|---|---|---|
| JP | H01-92632 A | 4/1998 |
| JP | 4429478 B2 | 3/2010 |
| JP | 2012-108021 A | 6/2012 |
| JP | 2016-024738 A | 2/2016 |
| WO | 2018/174164 A1 | 9/2018 |

OTHER PUBLICATIONS

International Search Report issued in corresponding International Patent Application No. PCT/JP2020/025549, dated Jul. 28, 2020, with English translation.

* cited by examiner

FIG. 7B  COMPARATIVE EXAMPLE

FIG. 7C  EMBODIMENT

LOAD SENSOR

CROSS REFERENCE TO RELATED APPLICATION

This application is a continuation of International Application No. PCT/JP2020/025549 filed on Jun. 29, 2020, entitled "LOAD SENSOR", which claims priority under 35 U.S.C. Section 119 of Japanese Patent Application No. 2019-155076 filed on Aug. 27, 2019, entitled "LOAD SENSOR". The disclosure of the above applications is incorporated herein by reference.

BACKGROUND OF THE INVENTION

1. Field of the Invention

The present invention relates to a load sensor that detects a load applied from the outside on the basis of a change in capacitance.

2. Disclosure of Related Art

To date, as a human machine interface (HMI), a capacitive load sensor has been used for various devices such as keyboards and game controllers. For example, Japanese Patent No. 4429478 describes a force detection device that includes a main substrate, an electrode, an insulating layer, a displacement generator, and an elastic conductive layer.

In this device, the electrode is formed on the upper surface of the main substrate and is covered with the insulating layer. The displacement generator includes a fixed part, a flexible part, and art action part, and the action part is connected to the fixed part, which is fixed to the main substrate, via the flexible part. The elastic conductive layer is formed on the bottom surface of the action part, and a rough surface composed of a large number of uneven structures is formed on the lower surface of the elastic conductive layer. When the action part is pressed against the main substrate, the contact state between the upper surface of the insulating layer and the rough surface of the elastic conductive layer changes, so that the capacitance based on the electrode and the elastic conductive layer changes. By electrically detecting the magnitude of the capacitance, the applied force (load) is detected.

In the capacitive load sensor, it is preferable that the capacitance changes linearly according to the load. That is, when the capacitance changes linearly according to the load, processing for calculating the load from the magnitude of the capacitance becomes very simple. Therefore, in the capacitive load sensor, it is preferable that the range where the capacitance changes linearly according to the load can be ensured to be as wide as possible. However, in the configuration of Japanese Patent No. 4429478, the range where the capacitance based on the electrode and the elastic conductive layer changes linearly according to the load is narrow. Therefore, with this configuration, it is difficult to detect a load through simple processing in a wide dynamic range.

SUMMARY OF THE INVENTION

A load sensor according to a first aspect of the present invention includes: an electrode; a dielectric formed on a lower surface of the electrode; and an elastic body disposed so as to face a lower surface of the dielectric and having conductivity plurality of projecting portions are formed on an upper surface of the elastic body, and the elastic body has a bending shape that is bent in an up-down direction, in at least a part thereof.

In the load sensor according to this aspect, since at least a part of the elastic body is bent in the up-down direction, when the upper surface of the electrode is pressed, the lower surface of the dielectric presses the elastic body, and the bending formed in the elastic body decreases according to the load applied to the electrode. At this time, the plurality of projecting portions formed on the elastic body come into contact with the dielectric in order from the projecting portions near the top of the bending to the projecting portions near the base of the bending. Accordingly, the number of the projecting portions that come into contact with the dielectric increases as the load increases. Also, as the load increases, the projecting portions are contracted, and the contact area between each projecting portion and the dielectric increases. Furthermore, after the bending of the elastic body is eliminated, the distance between the dielectric and the elastic body decreases as the projecting portions are contracted by the load. As described above, by changing the number of the projecting portions that come into contact with the dielectric, the contact area between each projecting portion and the dielectric, and the distance between the dielectric and the elastic body, the capacitance of a capacitor formed by the electrode, the dielectric, and the conductive elastic body can be changed linearly in a wide load range. Accordingly, a load can be detected through simple processing in a wide dynamic range. Thus, with the load sensor according to this aspect, a load can be detected through simple processing while ensuring a wide dynamic range.

A load sensor according to a second aspect of the present invention includes: an electrode; a dielectric formed on a lower surface of the electrode; and an elastic body disposed so as to face a lower surface of the dielectric and having conductivity plurality of projecting portions are formed on an upper surface of the elastic body, and at least either the elastic body or the electrode has a bending shape that is bent in an up-down direction, in at least a part thereof.

With the load sensor according to the second aspect, similar to the load sensor according to the first aspect, a load can be detected through simple processing in a wide dynamic range.

The effects and the significance of the present invention will be further clarified by the description of the embodiment below. However, the embodiment below is merely an example for implementing the present invention. The present invention is not limited by the description of the embodiment below in any way.

BRIEF DESCRIPTION OF THE DRAWINGS

FIG. 7B shows graphs schematically showing changes in capacitances of two types of capacitor portions and a graph schematically showing a change in total capacitance obtained by adding the capacitances of the two types of the capacitor portions, according to the comparative example;

FIG. 7C is a graph schematically showing a change in total capacitance obtained by adding the capacitances of two types of capacitor portions, according to the embodiment;

It should be noted that the drawings are solely for description and do not limit the scope of the present invention by any degree.

DESCRIPTION OF PREFERRED EMBODIMENTS

The present invention can be applied to an input part for performing an input corresponding to a load applied thereto. Specifically, the present invention can be applied to an input part of an electronic device such as a PC keyboard, an input part of a game controller, a surface layer part for a robot hand to detect an object, an input part for inputting a sound volume, an air volume, a light amount, a temperature, and the like, an input part of a wearable device such as a smartwatch, an input part of a hearable device such as a wireless earphone, an input part of a touch panel, an input part for adjusting an ink amount and the like in an electronic pen, an input part for adjusting a light amount, a color, and the like in a penlight, an input part for adjusting a light amount and the like in a garment that emits light, an input part for adjusting a sound volume and the like in a musical instrument, etc.

The following embodiment is a load sensor that is typically provided in the above devices. Such a load sensor is referred to as "capacitive pressure sensitive sensor element", "capacitive pressure detection sensor element", "pressure sensitive switch element", and the like. The following embodiment is one embodiment of the present invention, and the present invention is not limited to the following embodiment in any way.

Hereinafter, an embodiment of the present invention will be described with reference to the drawings. For convenience, in each drawing, X, Y, and Z axes that are orthogonal to each other are additionally shown. The Z-axis direction is the height direction of a load sensor 1.

Figure 1:
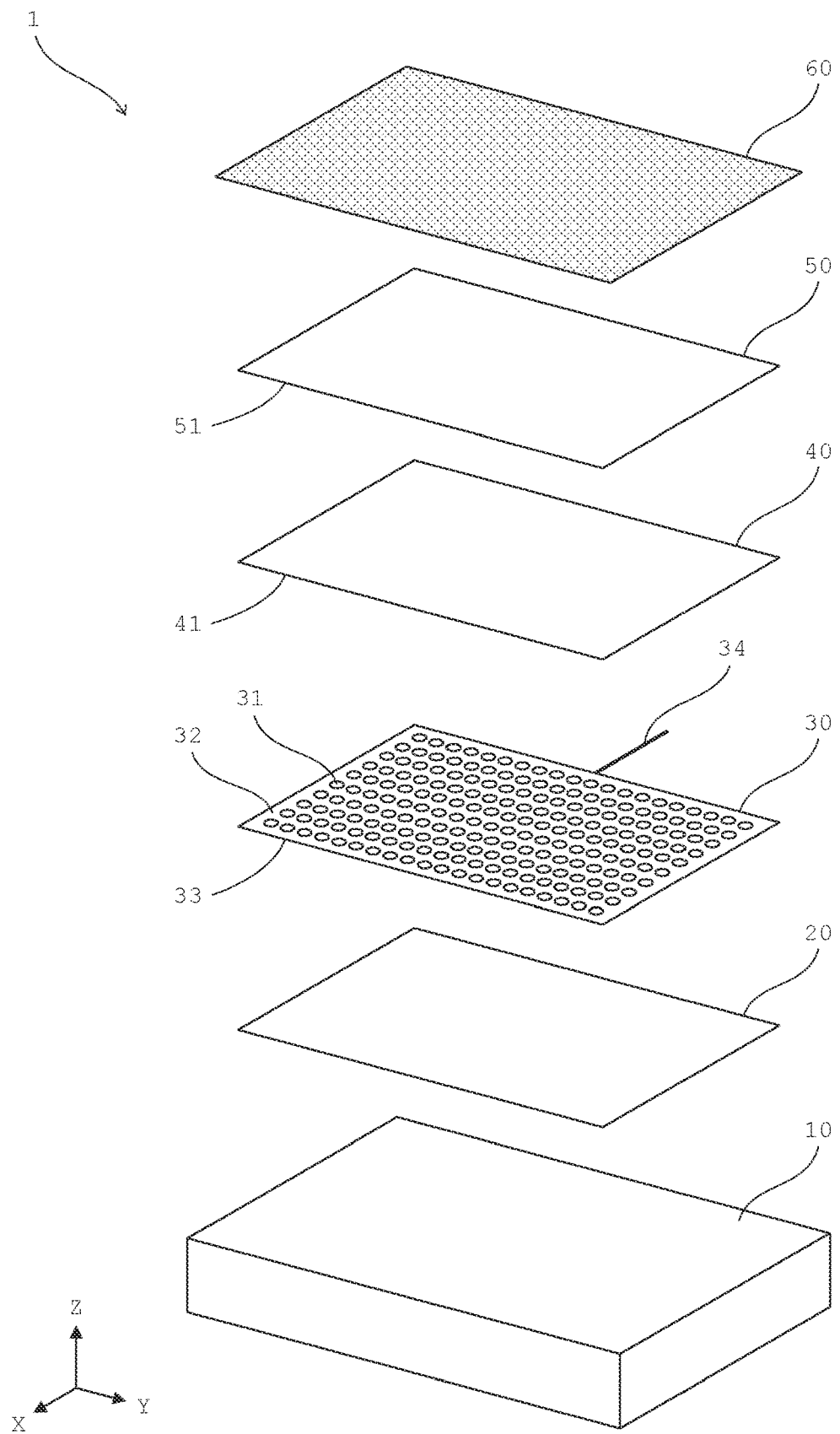
FIG. 1 is an exploded perspective view schematically showing a configuration of a load sensor according to an embodiment.

FIG. 1 an exploded perspective view schematically showing a configuration of the load sensor 1.

The load sensor 1 includes a substrate 10, a metal plate 20, a conductive elastic body 30, a dielectric 40, an electrode 50, and a cover 60.

The substrate 10 is a rectangular parallelepiped-shaped plate having a predetermined thickness, and is a support member for stacking and installing the metal plate 20, the conductive elastic body 30, the dielectric 40, the electrode 50, and the cover 60. The substrate 10 is, for example, at least one resin material selected from polyethylene terephthalate, polycarbonate, polyimide, and the like. The upper surface of the substrate 10 is parallel to the X-Y plane.

The metal plate 20 is a thin metal plate having a flat surface, and is made of, for example, SUS (stainless steel).

The conductive elastic body 30 is an elastic member having conductivity, and is composed of a resin material and a conductive filler dispersed therein, or a rubber material and a conductive filler dispersed therein. In the case where a resin material is used for the conductive elastic body 30, the resin material is, for example, a styrene-based resin, a silicone-based resin (polydimethylpolysiloxane (PDMS), or the like), an acrylic-based resin, a rotaxane-based resin, a urethane-based resin, or the like.

In the case where a rubber material is used for the conductive elastic body 30, the rubber material is, for example, at least one rubber material selected from silicone rubber, isoprene rubber, butadiene rubber, styrene-butadiene rubber, chloroprene rubber, nitrile rubber, polyisobutylene, ethylene propylene rubber, chlorosulfonated polyethylene, acrylic rubber, fluorine rubber, epichlorohydrin rubber, and urethane rubber. The conductive filler used for the conductive elastic body 30 is, for example, at least one material selected from Au (gold), Ag (silver), Cu (copper), C (carbon), ZnO (zinc oxide), $In_2O_3$ (indium (III) oxide), and $SnO_2$ (tin oxide (IV)).

A plurality of projecting portions 31 are formed on an upper surface 32 (surface on the Z-axis positive side) of the conductive elastic body 30 so as to project in the Z-axis positive direction and be arranged in a grid pattern. Each projecting portion 31 has a cross-sectional area that decreases with advancement in the Z-axis positive direction, and has a spherical shape. In the example shown in FIG. 1, on the upper surface 32, rows of projecting portions 31 are aligned in the X-axis direction and 20 rows of projecting portions 31 are aligned in the Y-axis direction, so that a total of 200 projecting portions 31 are formed. In addition, a conducting wire 34 for electrically connecting the conductive elastic body 30 and a device external to the load sensor 1 is provided to the conductive elastic body 30.

Here, the metal plate 20 and the conductive elastic body 30 are integrally molded by, for example, injection in molding (insert molding). Specifically, the metal plate 20 is inserted into a mold in advance, the material of the conductive elastic body 30 is injected thereinto, and an integrated structure is produced by a molding method for integrating the metal and the resin. In this case, in a cooling process after molding, a shape in which a center portion is bent with respect to an end portion is formed due to the difference in expansion rate between the metal plate 20 and the conductive elastic body 30. Since the metal plate 20 and the conductive elastic body 30 are integrally molded as described above, the metal plate 20 and the conductive elastic body 30 are bent such that the center in the X-Y plane projects in the Z-axis positive direction (direction perpendicular to a lower surface 41 of the dielectric 40). That is, the structure in which the metal plate 20 and the conductive elastic body 30 are integrally molded is bent in a spherical shape in a direction perpendicular to the X-Y plane, and a top portion (around the center in the X-Y plane) bent in a spherical shape projects in the Z-axis positive direction.

Figure 2A:
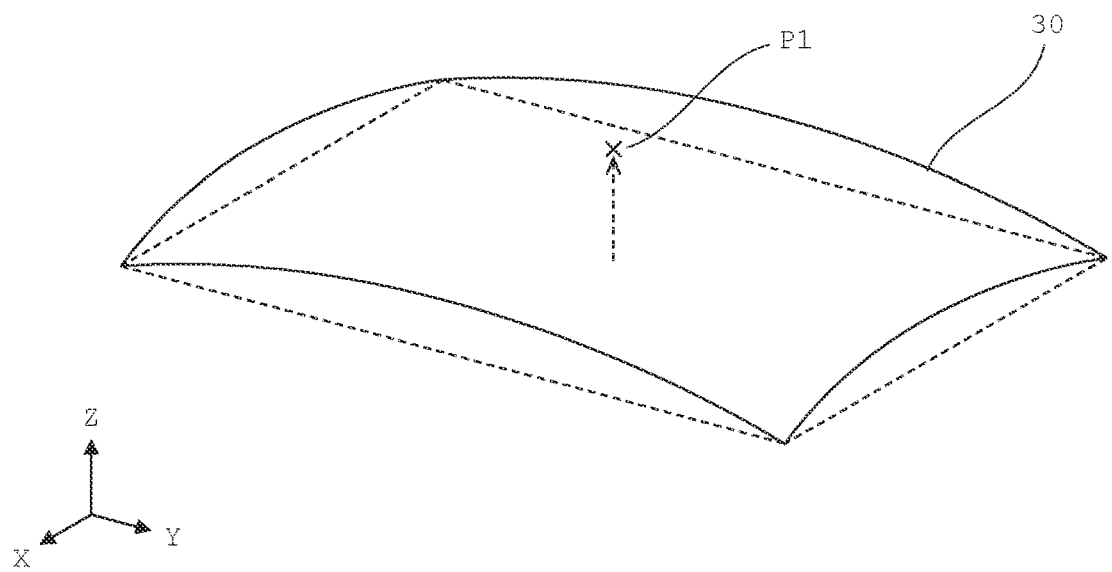
FIG. 2A is a perspective view schematically showing a state where a conductive elastic body integrally molded with a metal plate is bent, according to the embodiment.

FIG. 2A is a perspective view schematically showing a state where the conductive elastic body 30 integrally molded with the metal plate 20 is bent. In FIG. 2A, for convenience, the projecting portions 31 are not shown, and the conductive elastic body 30 is illustrated such that the degree of bending thereof is larger. As shown in FIG. 2A, the conductive elastic body 30 is bent such that a center portion P1 thereof in the X-Y plane projects in the Z-axis positive direction with respect to an end portion thereof. The entirety of the conductive elastic body 30 shown in FIG. 2A is bent in the up-down direction, and the number of bending shapes of the conductive elastic body 30 is one.

Referring back to FIG. 1, the dielectric 40 has electrical insulation and is made of, for example, a polypropylene resin, a polyethylene terephthalate resin, a polyimide resin, a polyphenylene sulfide resin, $Al_2O_3$, $Ta_2O_5$, or the like. The electrode 50 is a metal having conductivity and is made of, for example, an electrode material composed of $In_2O_3$, ZnO and/or $SnO_2$, or the like. The dielectric 40 is formed on a lower surface 51 of the electrode 50 by, for example, vapor deposition. The lower surface 51 of the electrode 50 is parallel to the X-Y plane, and the dielectric 40 is formed on the lower surface 51 of the electrode 50 such that the lower surface 41 is parallel to the X-Y plane.

The cover 60 is made of a flexible material, and the flexible material is, for example, at least one resin material selected from polyethylene terephthalate, polycarbonate, polyimide, and the like.

When assembling the load sensor 1, a structure consisting of the metal plate 20 and the conductive elastic body 30 is placed on the upper surface of the substrate 10 while the bending thereof is maintained. Then, a structure consisting of the dielectric 40 and the electrode 50 is placed on the upper surface of the structure consisting of the metal plate 20 and the conductive elastic body 30 such that the conductive elastic body 30 faces the lower surface 41 of the dielectric 40. Then, the cover 60 is put on the electrode 50, and the periphery of the cover 60 is placed on the upper surface of the substrate 10. As a result, the load sensor 1 is completed as shown in FIG. 2B.

Figure 2B:
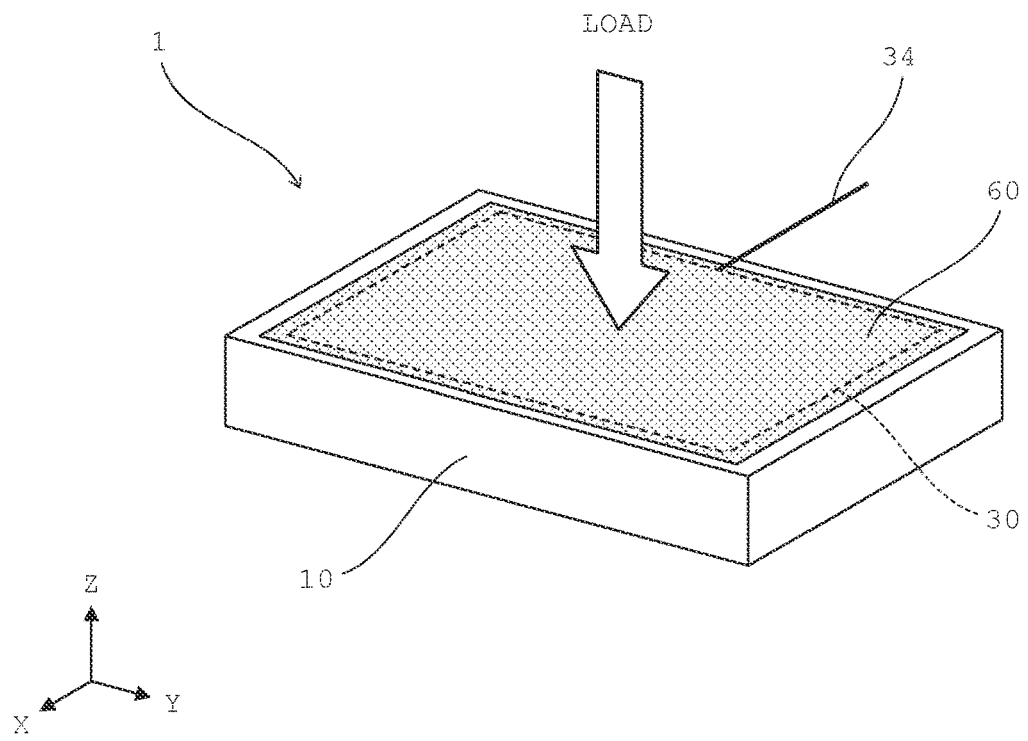
FIG. 2B is a perspective view schematically showing a configuration of the assembled load sensor according to the embodiment.

FIG. 2B is a perspective view schematically showing a configuration of the assembled load sensor 1.

The conductive elastic body 30, the dielectric 40, and the electrode 50 inside the load sensor 1 have a function as a capacitor. When a load is applied to the upper surface of the cover 60, the lower surface 41 (see FIG. 1) of the dielectric 40 presses the conductive elastic body 30 in the downward direction (Z-axis negative direction), and the conductive elastic body 30 becomes deformed. Accordingly, the capacitance of the capacitor composed of the conductive elastic body 30, the dielectric 40, and the electrode 50 changes. This change in capacitance is detected by the external device connected to the conducting wire 34. The external device detects the load applied to the load sensor 1 on the basis of the change in capacitance.

FIG. 3A to FIG. 4B are each a side view schematically showing the inside of the load sensor 1 as viewed in the X-axis negative direction. In FIG. 3A to FIG. 4B, for convenience, three projecting portions 31 are shown to be aligned in the Y-axis direction, and are illustrated such that the scale thereof in the Z-axis direction is larger.

Figure 3A:
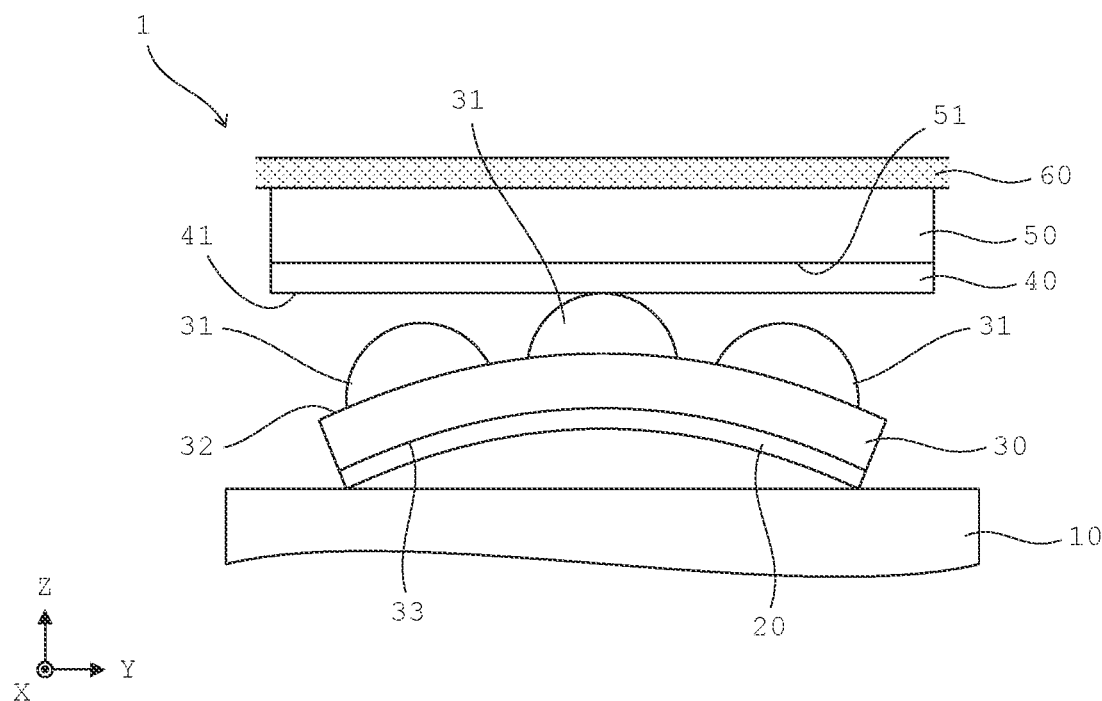
FIG. 3A and FIG. 3B are each a side view schematically showing the inside of the load sensor, as viewed in an X-axis negative direction, according to the embodiment.

As shown in FIG. 3A, in the present embodiment, when no load is applied to the cover 60 (hereinafter, referred to as "initial state"), the distance between the upper end of the central projecting portion 31 and the lower surface 41 of the dielectric 40 is 0, and no force is applied from the dielectric 40 to the conductive elastic body 30.

Figure 3B:
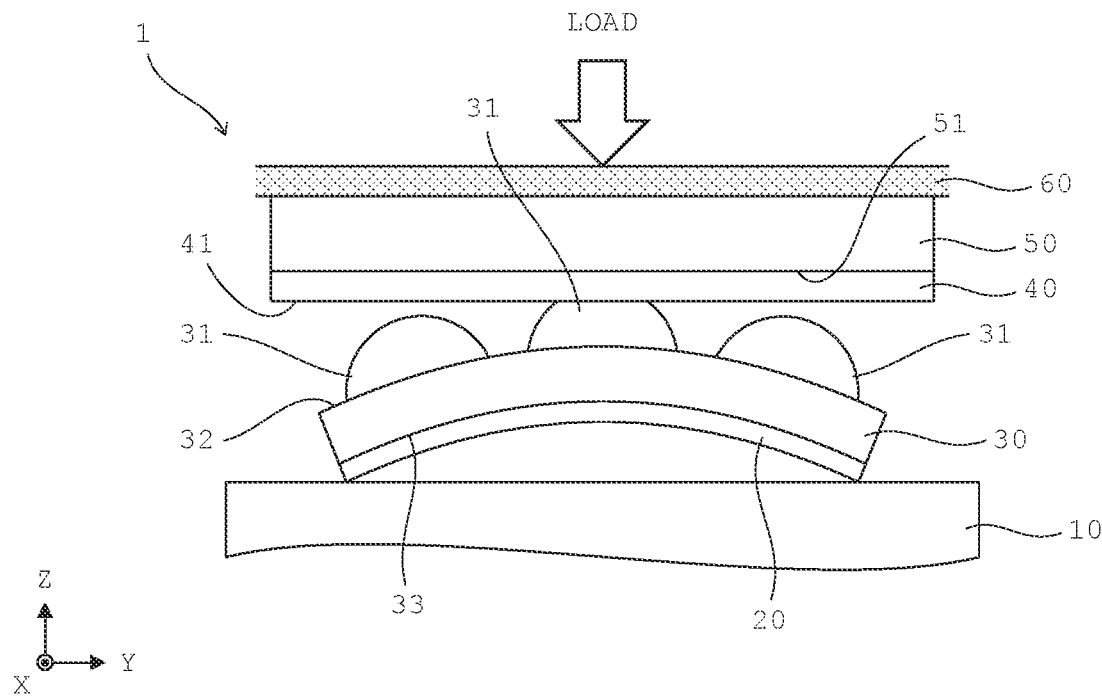

As shown in FIG. 3B, when a load is applied to the upper surface of the cover 60 from the initial state of FIG. 3A, the lower surface 41 of the dielectric 40 moves in the downward direction from the state of FIG. 3A. Accordingly, the central projecting portion 31 is pressed in the downward direction by the lower surface 41 of the dielectric 40. At this time, if the load is small, as shown in FIG. 3B, the central projecting portion 31 is elastically deformed by the dielectric 40, but the projecting portion 31 at each end does not come into contact with the lower surface 41 of the dielectric 40.

Figure 4A:
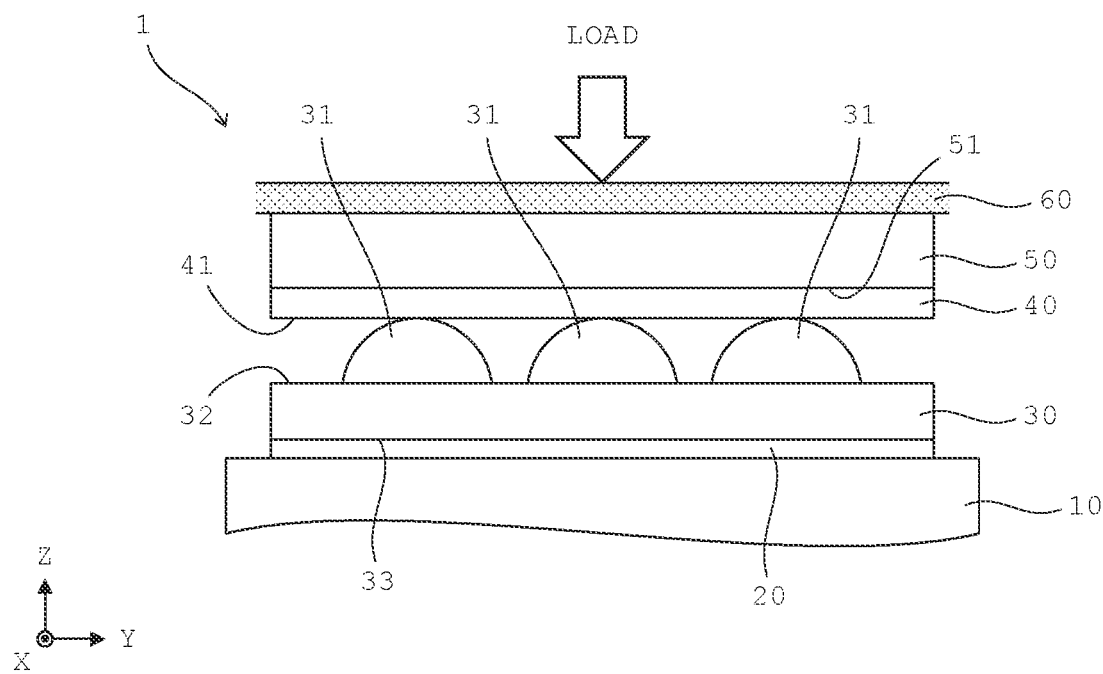
FIG. 4A and FIG. 4B are each a side view schematically showing the inside of the load sensor, as viewed in the X-axis negative direction, according to the embodiment.

As shown in FIG. 4A, when a further load is applied to the upper surface of the cover 60 from the state of FIG. 3B, the lower surface 41 of the dielectric 40 further moves in the downward direction from the state of FIG. 3B. Accordingly, the bending of the conductive elastic body 30 is eliminated, and the conductive elastic body 30 becomes parallel to the X-Y plane. At this time, all the projecting portions 31 are in contact with the lower surface 41 of the dielectric 40, and a force is almost equally applied from the dielectric 40 to all the projecting portions 31. At this time, the upper end of each projecting portion 31 becomes slightly elastically deformed.

Figure 4B:
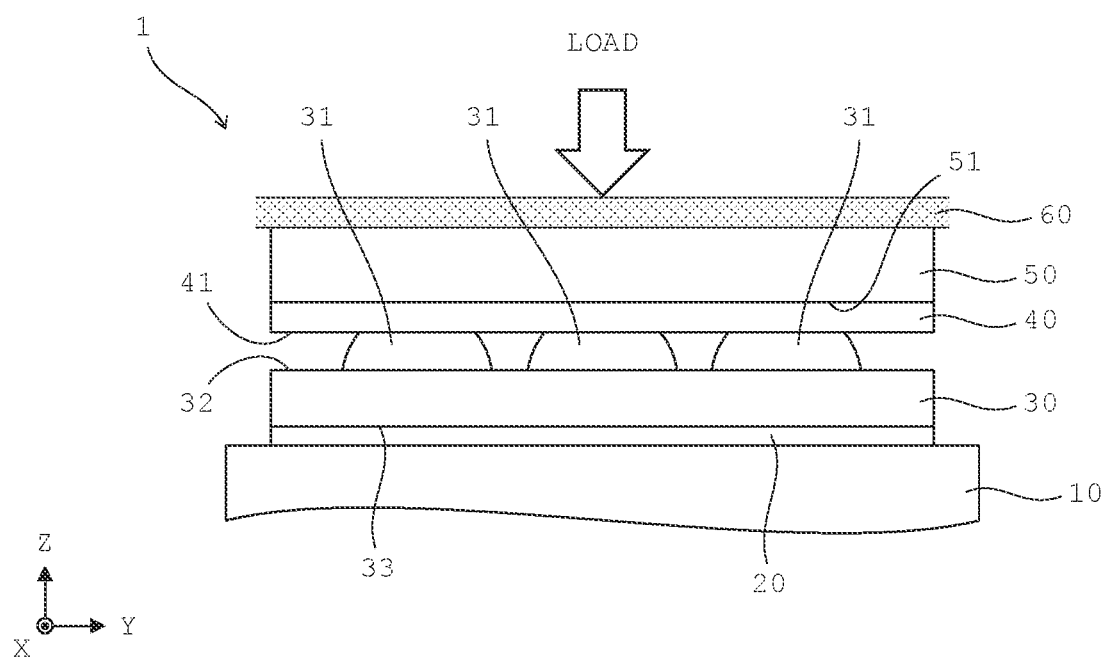

As shown in FIG. 4B, when a further load is applied to the upper surface of the cover 60 from the state of FIG. 4A, the lower surface 41 of the dielectric 40 further moves in the downward direction from the state of FIG. 4A. Accordingly, the upper end of each projecting portion 31 becomes further elastically deformed and contracted in the downward direction.

FIG. 5A to FIG. 6B are each a top view schematically showing a state where, as the load increases, the projecting portion 31 of the conductive elastic body 30 becomes elastically deformed and the contact area between the conductive elastic body 30 and the dielectric 40 becomes wider. In FIG. 5A to FIG. 6B, for convenience, only the conductive elastic body 30 when viewed in the Z-axis negative direction is shown, and the contact region between the conductive elastic body 30 and the dielectric 40 is hatched.

Figure 5A:
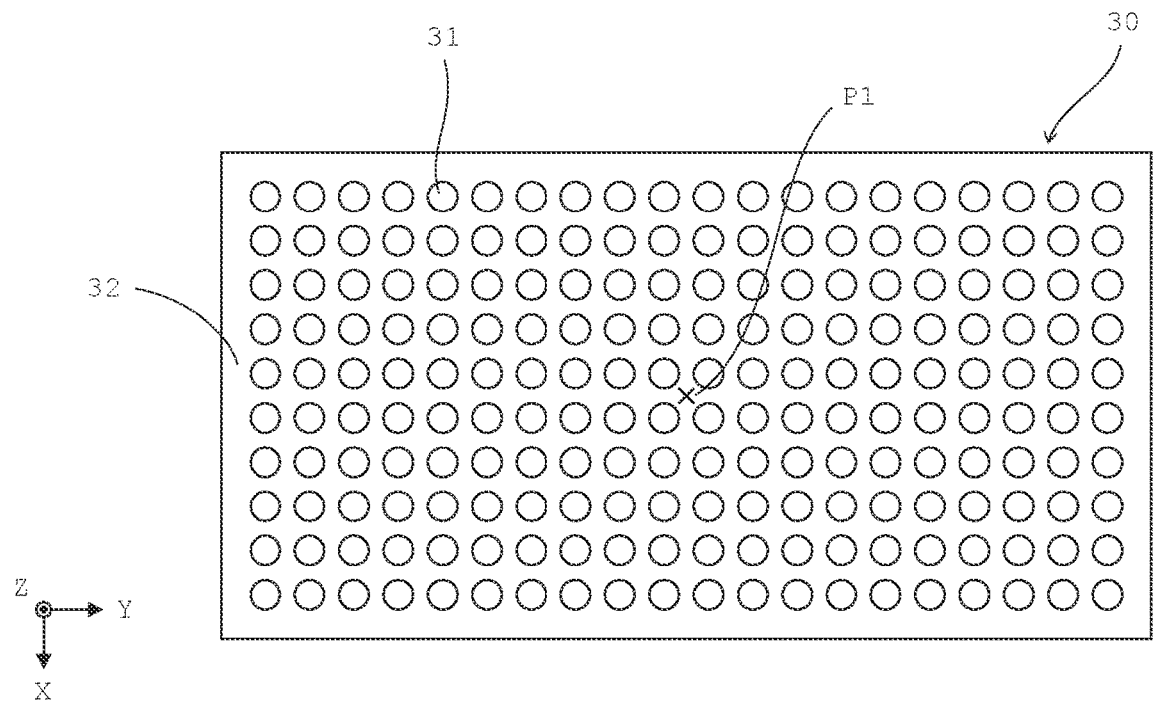
FIG. 5A and FIG. 5B are each a top view schematically showing the contact area between the conductive elastic body and a dielectric, as viewed in a Z-axis negative direction, according to the embodiment.
Figure 5B:
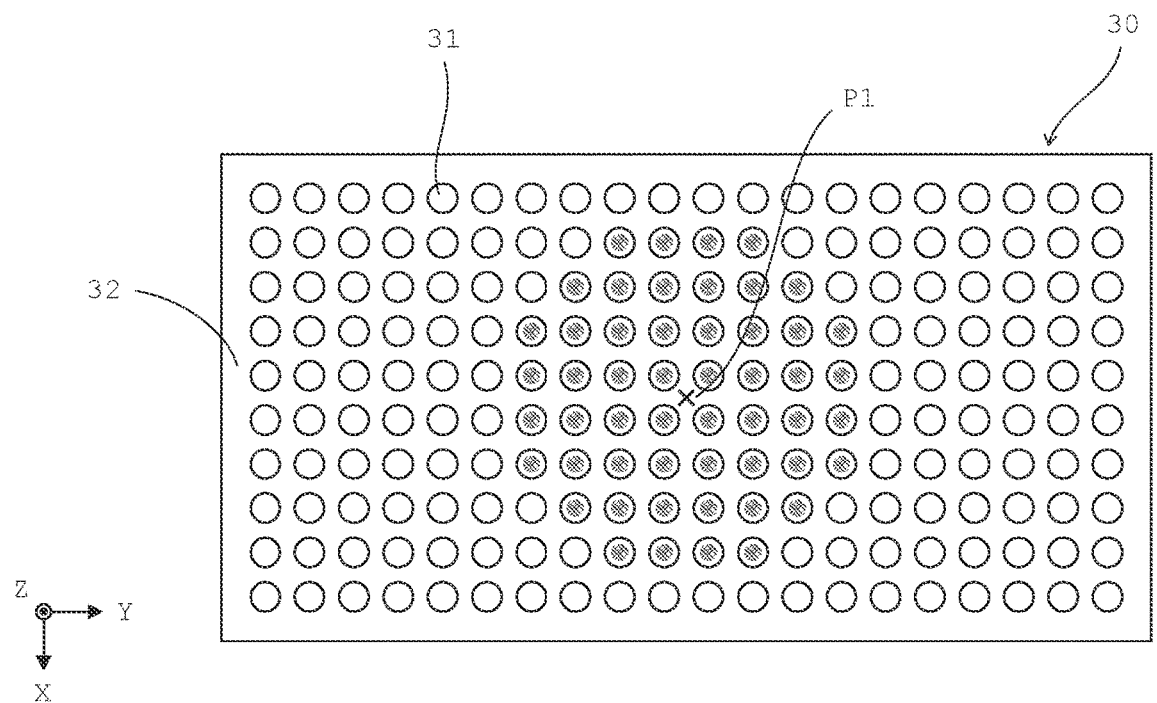
Figure 6A:
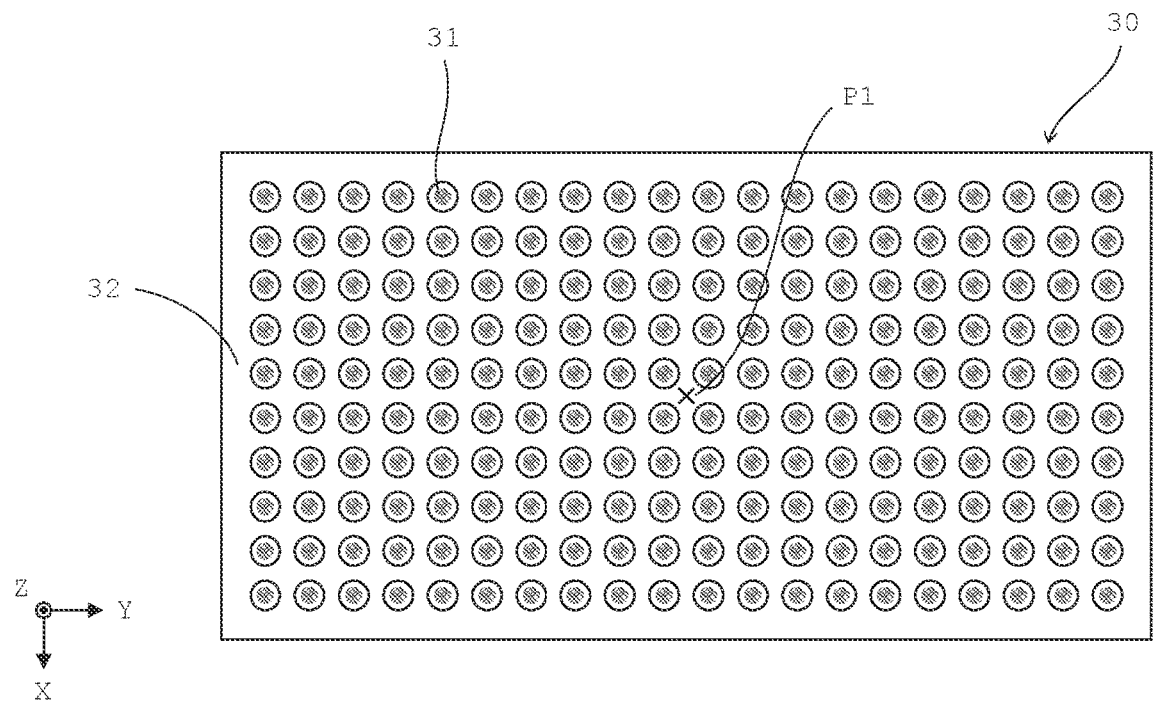
FIG. 6A and FIG. 6B are each a top view schematically showing the contact area between the conductive elastic body and the dielectric, as viewed in the Z-axis negative direction, according to the embodiment.
Figure 6B:
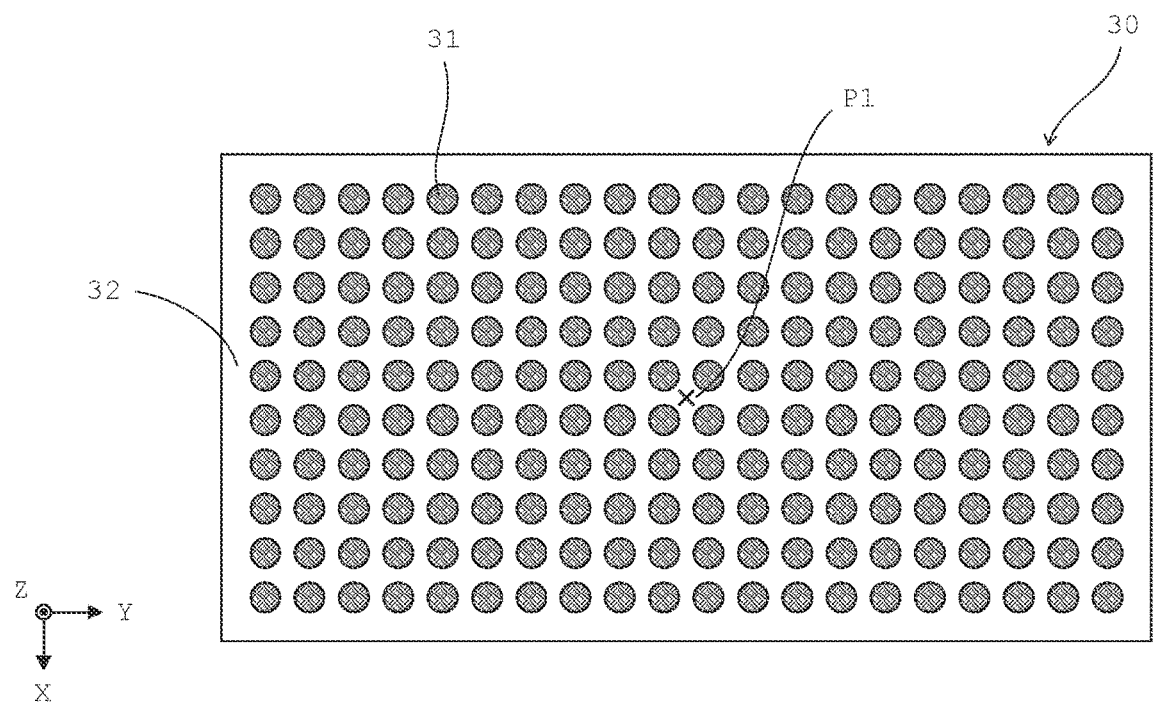

As shown in FIG. 5A, in the initial state, the conductive elastic body 30 and the dielectric 40 are not in contact with each other. When a load is applied from the state of FIG. 5A, as shown in FIG. 5B, the dielectric 40 is pressed against the projecting portions 31, the contact region between the projecting portions 31 and the dielectric 40 is expanded with the center portion P1 of the conductive elastic body 30 (upper end position of the spherical shape of the conductive elastic body 30 in the initial state) as a center. When a further load is applied from the state of FIG. 5B, as shown in FIG. 6A, the dielectric 40 is pressed against all the projecting portions 31, and all the projecting portions 31 come into contact with the dielectric 40. When a further load is applied from the state of FIG. 6A, as shown in FIG. 6B, the dielectric 40 is further pressed against the projecting portions 31, and the contact area between each projecting portion 31 and the dielectric 40 is further expanded.

Thus, according to the present embodiment, the number of the projecting portions 31 that come into contact with the dielectric 40 increases according to the applied load, and the contact area between the conductive elastic body 30 and the dielectric 40 is further expanded. In addition, as shown in FIG. 4A and FIG. 4B, after all the projecting portions 31 come into contact with the dielectric 40, the projecting portions 31 are contracted according to the load, and the distance between the dielectric 40 and the upper surface 32 of the conductive elastic body 30 becomes shorter. Due to these factors, in the present embodiment, the capacitance of the capacitor formed by the conductive elastic body 30, the dielectric 40, and the electrode 50 gradually changes according to the applied load.

Next, the capacitance of the present embodiment changing linearly according to a load will be described.

Figure 7A:
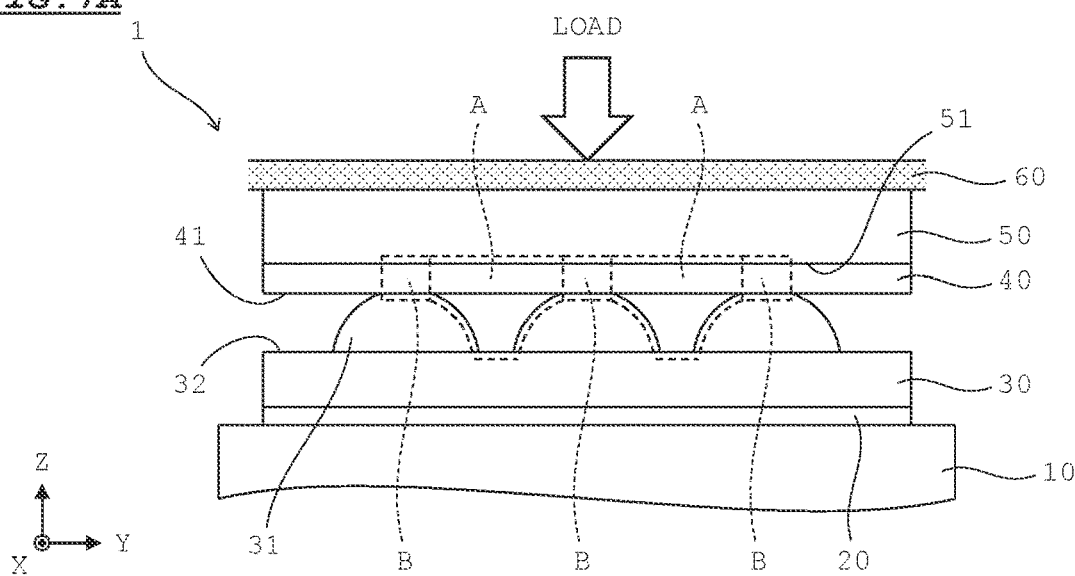
FIG. 7A is a side view schematically showing a state where all projecting portions aligned in a Y-axis direction are pressed by the dielectric, according to the embodiment and a comparative example.
Figure 7A:
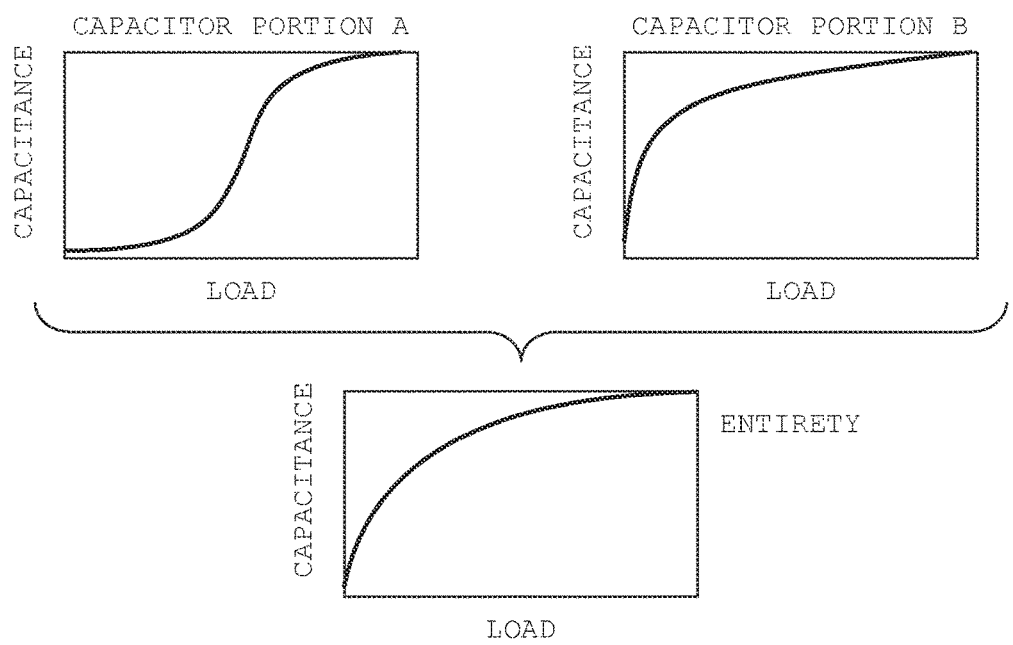
Figure 7A:
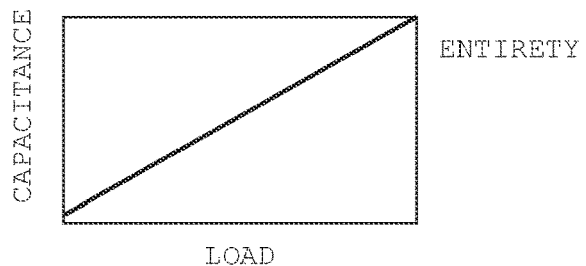

FIG. 7A is a side view schematically showing a state where a load is applied to the upper surface of the cover 60 and all the projecting portions 31 aligned in the Y-axis direction are pressed by the dielectric 40.

When the projecting portions 31 come into contact with the lower surface 41 of the dielectric 40, capacitor portions A based on the regions where the projecting portions 31 and the lower surface 41 are not in contact with each other and capacitor Portions B based on the regions where the projecting portions 31 and the lower surface 41 are in contact with each other are formed. Each capacitor portion A includes a portion of the conductive elastic body 30 that is not in contact with the lower surface 41 of the dielectric 40, a portion of the electrode 50 that exists at a position facing the portion of the conductive elastic body 30 that is not in contact with the lower surface 41, and portions of the dielectric 40 and an air layer that are located between these portions. Meanwhile, each capacitor portion B includes a portion of the conductive elastic body 30 that is in contact with the lower surface 41 of the dielectric 40, a portion of the electrode 50 that exists at a position facing the portion of the conductive elastic body 30 that is in contact with the lower surface 41, and a portion of the dielectric 40 that is located between these portions.

If the projecting portions 31 are provided to the conductive elastic body 30 as in the present embodiment, when a load is applied, the contact area between each projecting portion 31 and the dielectric 40 changes, and the gap of the air layer also changes. Accordingly, the capacitance of each capacitor portion A and the capacitance of each capacitor portion B change.

Here, a change in capacitance in a comparative example will be described.

In the comparative example, unlike the present embodiment, in the initial state, the metal plate 20 and the conductive elastic body 30 are parallel to the X-Y plane. Therefore, in the comparative example, when a load is applied to the cover 60 from the initial state, all the projecting portions are simultaneously pressed by the lower surface 41 of the dielectric 40.

The graph on the upper left of FIG. 7B is a graph schematically showing a change in the capacitance based on all the capacitor portions A in the comparative example. In the case of the capacitor portions A, until the load increases to some extent, the capacitance substantially does not increase, and when the load increases to some extent, the capacitance increases sharply due to decrease of the range of each capacitor portion A and the gap of the air layer.

Meanwhile, the graph on the upper right of FIG. 7B is a graph schematically showing a change in the capacitance based on all the capacitor portions B in the comparative example. In the case of the capacitor portions B, until the load increases to some extent from the initial state, the capacitance increases sharply due to increase of the range of each capacitor portion B, and when the load increases to some extent, the increase in the capacitance decreases.

Since the air layer is formed between the lower surface 41 of the dielectric 40 and the upper surface 32 of the conductive elastic body 30, the capacitance based on the capacitor portions A is much lower than the capacitance based on the capacitor Portions B. Therefore, with the configuration of the comparative example, the change in capacitance corresponding to the change in load is dominated by the change in capacitance in the capacitor portions B.

The graph on the lower side of FIG. 7B is a graph schematically showing a change in total capacitance obtained by adding the capacitances of the capacitor portions A and the capacitances of the capacitor portions B. As described above, in the comparative example, the capacitance (total capacitance) of the capacitor formed by the conductive elastic body 30, the dielectric 40, and the electrode 50 is less likely to change linearly according to the load due to influence of the capacitances of the capacitor portions B. In the comparative example, the capacitance changes substantially linearly in a small range where the load is small, that is, in a load range where the capacitance in each capacitor portion B increases sharply according to the load, but in the subsequent load range, the change in capacitance slows down sharply, and the capacitance does not change linearly. As described above, in the comparative example, the load range where the capacitance can be changed linearly becomes considerably narrow.

On the other hand, in the case of the present embodiment, as described with reference to FIG. 3A to FIG. 4B and FIG. 5A to FIG. 6B, when a load is applied from the initial state, the projecting portions 31 come into contact with the dielectric 40 in order from the central projecting portion 31. Therefore, in the range where the load is small, the change in capacitance based on the capacitor portions B becomes more gradual than in the comparative example. Accordingly, as shown in FIG. 7C, the capacitance (total capacitance; of the capacitor formed by the conductive elastic body 30, the dielectric 40, and the electrode 50 changes linearly according to the load. As a result, in the present embodiment, the load range where the capacitance can be changed linearly can be expanded.

Verification Experiment

For the load sensor 1 having the above configuration, the inventors actually confirmed a change in capacitance through a verification experiment.

In this verification experiment, the conductive elastic body 30 of the load sensor 1 was made using a rubber material and a conductive filler dispersed therein. A silicone rubber was used as the rubber material, and C (carbon) was used as the conductive filler. The elastic modulus of the conductive elastic body 30 was set to about $1.0 \times 10^6$ (Pa). The dielectric 40 was made using polyimide, and the dielectric constant of the dielectric 40 was set to 3.

Figure 8A:
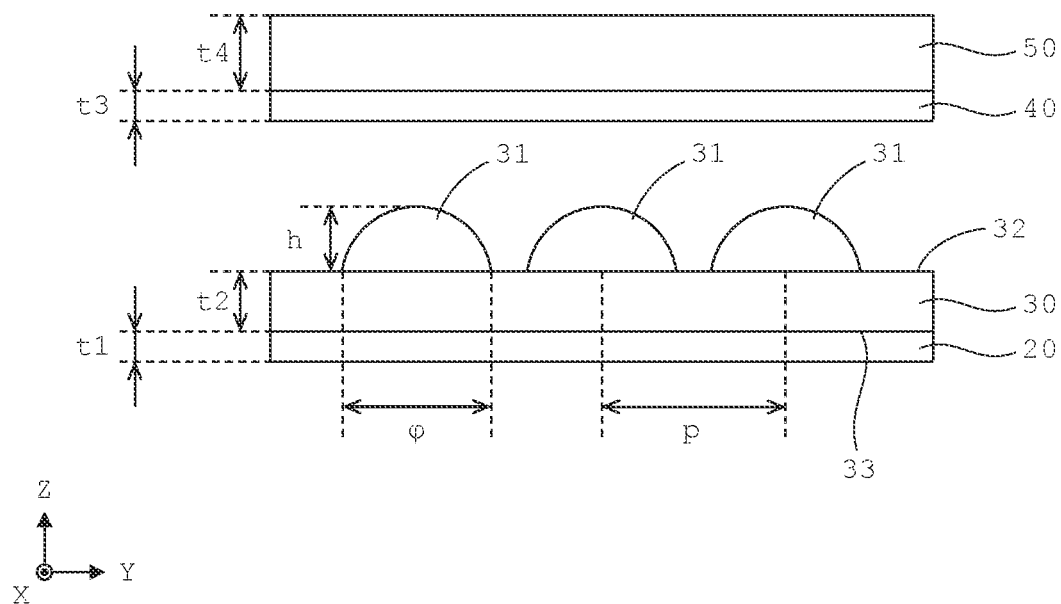
FIG. 8A and FIG. 8B are each a schematic diagram for illustrating the size of each part of the load sensor according to a verification experiment of the embodiment.

The size of each part of the load sensor 1 used in the verification experiment will be described with reference to FIG. 8A and FIG. 8B. In FIG. 8A, for convenience, the metal plate 20 and the conductive elastic body 30 are shown on the assumption that the metal plate 20 and the conductive elastic body 30 are not bent.

As shown in FIG. 8A, the thickness of the metal plate 20 is denoted by t1, the thickness of the conductive elastic body 30 (width from the upper surface 32 to a lower surface 33 thereof) is denoted by t2, the thickness of the dielectric 40 is denoted by t3, the thickness of the electrode 50 is denoted by t4, the height of each projecting portion 31 (width from the upper surface 32 to the upper end of the projecting portion 31) is denoted by h, the diameter of the lower end of each projecting portion 31 is denoted by φ, and the pitch of the projecting portions 31 (distance between the centers of the projecting portions 31 adjacent to each other in the X-axis direction and the Y-axis direction) is denoted by p. In the verification experiment, the thickness t1 was set to 100 μm, the thickness t2 was set to 100 μm, the thickness t3 was set to 22.5 μm, the thickness t4 was set to 50 μm, the height h was set to 60 μm, the diameter φ was set to 91.9 μm, and the pitch p was set to 300 μm.

Figure 8B:
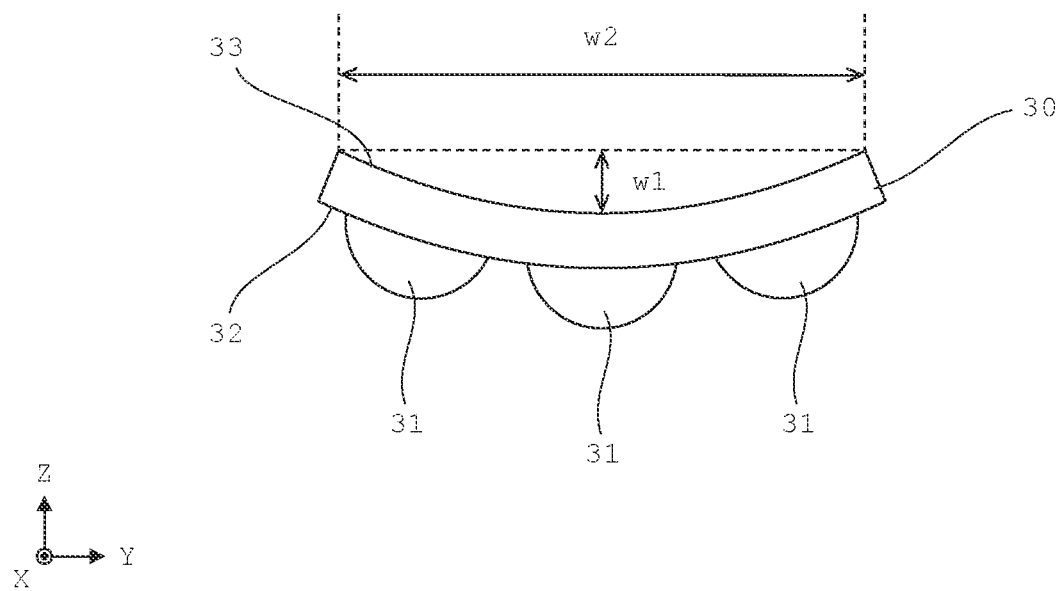

As shown in FIG. 8B, in the verification experiment, by disposing the load sensor 1 upside down, a state where the center portion P1 of the conductive elastic body 30 in the initial state was bent in the downward direction (Z-axis negative direction), was obtained. At this time, the bending width (difference in height in the Z-axis direction between the end portion and the center of the conductive elastic body 30) of the conductive elastic body 30 is denoted by w1, the width in the Y-axis direction of the conductive elastic body 30 in the bent state is denoted by w2, and a warpage rate (%) of the conductive elastic body 30 is denoted by w1/w2. In the verification experiment, a load sensor 1 (comparative example) having a warpage rate of 0% and load sensors 1 (embodiment) having warpage rates of 0.5% and 1.3% were prepared, a load was applied to the electrode 50 of each load sensor 1 in the Z-axis positive direction, and a capacitance and a dynamic range were calculated.

Figure 9A:
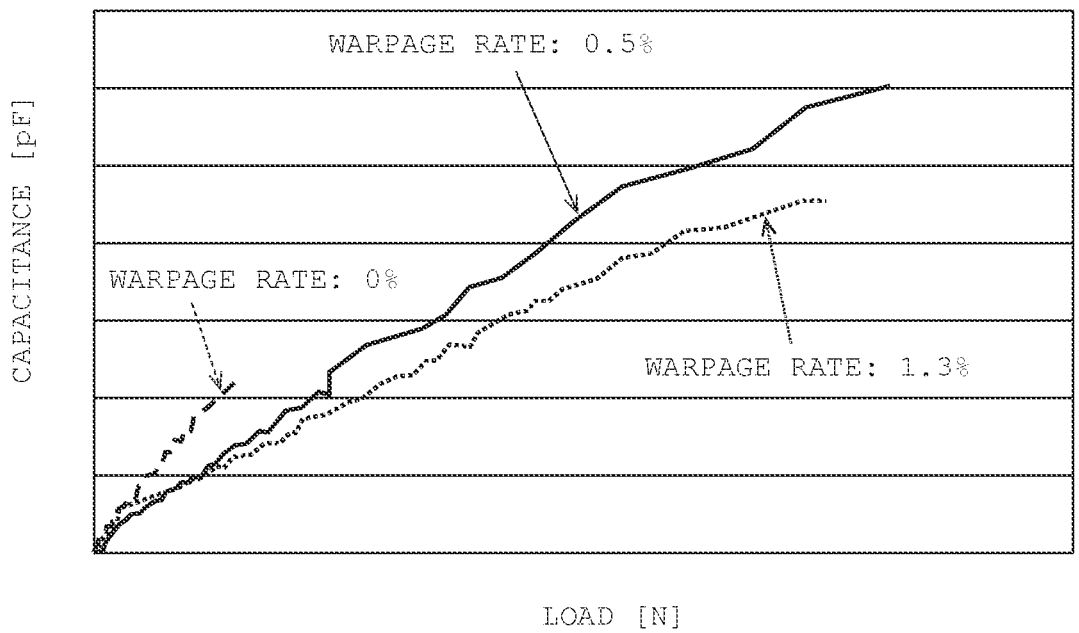
FIG. 9A is a graph showing the relationship between load and capacitance according to the verification experiment of the embodiment.

FIG. 9A is a graph showing the relationship between load (N) and capacitance (pF) in this verification experiment. The capacitance was detected by a device connected to the conducting wire 34 of the conductive elastic body 30. The graph of FIG. 9A shows only the range where the capacitance changes linearly according to the load.

As shown in FIG. 9A, in the load sensor 1 (comparative example) having a warpage rate of 0%, the range where the relationship between the load and the capacitance is linear remained as a small range after the load was applied. On the other hand, in the load sensor 1 (embodiment) having a warpage rate of 1.3%, the relationship between the load and the capacitance was able to be kept linear in a fairly wide range after the load was applied. In the load sensor 1 (embodiment) having a warpage rate of 0.5%, the range where the relationship between the load and the capacitance is linear was able to be further expanded as compared to that in the load sensor 1 having a warpage rate of 1.3%. From this verification experiment, it was found that, by bending the conductive elastic body 30 in the initial state as in the embodiment, higher linearity can be achieved in a wider dynamic range as compared to the case where the conductive elastic body 30 is not bent at all in the initial state as in the comparative example.

Based on the above verification experiment, the same dynamic range and linearity as in the verification experiment are expected by setting the thickness t1 to 0.01 mm to 0.2 mm, setting the thickness t2 to 0.05 mm to 1 mm, setting the thickness t3 to 0.001 mm to 0.1 mm, setting the thickness t4 to 0.01 mm to 0.1 mm, setting the height h to 0.01 mm to 0.1 mm, setting the diameter φ to 0.05 mm to 0.5 mm, setting the pitch p to 0.05 mm to 1 mm, and setting the dielectric constant of the dielectric 40 to 0.1 to 100.

Figure 9B:
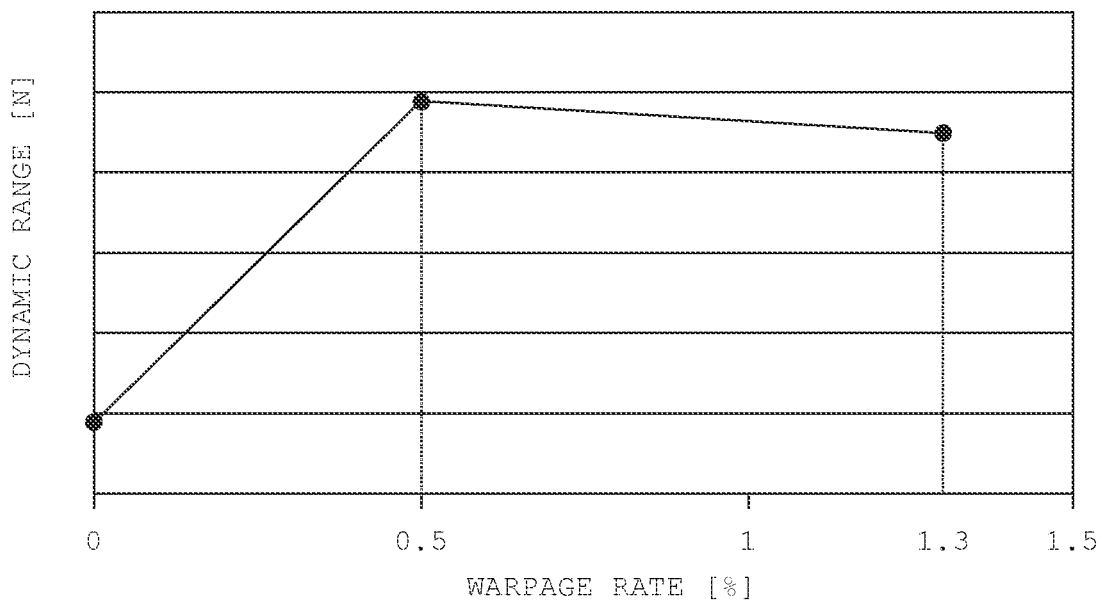
FIG. 9B is a graph showing the relationship between warpage rate and dynamic range according to the verification experiment of the embodiment.

FIG. 9B is a graph showing the relationship between warpage rate (%) and load range where the relationship between the load and the capacitance can be kept linear (dynamic range where linearity can be maintained) in this verification experiment.

As shown in FIG. 9B, the dynamic range of each of the load sensors 1 (embodiment) having warpage rates of 0 and 1.3% was about 4 to 5 times larger than the dynamic range of the load sensor 1 (comparative example) having a warpage rate of 0%. From this, it was found that, by bending the conductive elastic body 30 in the initial state as in the embodiment, the dynamic range (load range where the capacitance can be changed linearly) can be set to be wider as compared to the case where the conductive elastic body 30 is not bent at all in the initial state as in the comparative example.

Also, from the results of FIG. 9B, it was confirmed that the dynamic range is not necessarily expanded even when the warpage rate (%) becomes higher, and an optimum warpage rate can be expected according to the material of the conductive elastic body 30 and the shape (width, height, etc.) of each projecting portion 31. Therefore, it can be said that, in order to further expand the dynamic range where the capacitance can be changed linearly, it is preferable to examine and set an optimum warpage rate according to the material of the conductive elastic body 30 and the shape (width, height, etc.) of each projecting portion 31.

Effects of Embodiment

According to the embodiment described above, the following effects are achieved.

Since the conductive elastic body 30 is bent in the up-down direction (direction perpendicular to the lower surface 41 of the dielectric 40), when the upper surface of the electrode 50 is pressed, the lower surface 41 of the dielectric 40 presses the conductive elastic body 30, and the bending of the conductive elastic body 30 decreases according to the load applied to the electrode 50. At this time, the plurality of projecting portions 31 formed on the conductive elastic body 30 come into contact with the dielectric 40 in order from the projecting portions 31 near the top of the bending to the projecting portions 31 near the base of the bending. Accordingly, the number of the projecting portions 31 that come into contact with the dielectric 40 increases as the load increases. Also, as the load increases, the protecting portions 31 are contracted, and the contact area between each projecting portion 31 and the dielectric 40 increases. Furthermore, after the bending of the conductive elastic body 30 is eliminated, the distance between the dielectric 40 and the conductive elastic body 30 decreases as the projecting portions 31 are contracted by the load.

As described above, by changing the number of the projecting portions 31 that come into contact with the dielectric 40, the contact area between each projecting portion 31 and the dielectric 40, and the distance between the dielectric 40 and the conductive elastic body 30, the capacitance of the capacitor formed by the electrode 50, the dielectric 40, and the conductive elastic body 30 can be changed linearly in a wide load range. Accordingly, a load can be detected through simple processing in a wide dynamic range. Therefore, a load can be detected through simple processing while ensuring a wide dynamic range.

As shown in FIG. 2A, as for the bending shape of the conductive elastic body 30, the conductive elastic body 30 is bent (in the Z-axis positive direction) such that the center portion P1 thereof is closer to the dielectric 40 than the end portion thereof. Accordingly, as shown in FIG. 5A and FIG. 5B, when the upper surface of the electrode 50 is pressed, the range of the projecting portions 31 that are in contact with the dielectric 40 is uniformly expanded from the center to the periphery. Therefore, the range of the projecting portions 31 that are in contact with the dielectric 40 can be stably increased or decreased, so that the capacitance can be easily changed linearly according to the load.

As shown in FIG. 5A, the plurality of projecting portions 31 are formed on the upper surface 32 of the conductive elastic body 30 so as to be arranged in a grid pattern. Accordingly, as shown in FIG. 5B, when the upper surface of the electrode 50 is pressed, the range of the projecting portions 31 that are in contact with the dielectric 40 is uniformly expanded from the center to the periphery. Therefore, the range of the pro ding portions 31 that are in contact with the dielectric 40 can be stably increased or decreased, so that the capacitance can be easily changed linearly according to the load.

The metal plate 20 is provided on the lower surface 33 of the conductive elastic body 30 as a thin metal plate for defining the bending of the conductive elastic body 30. Accordingly, the initial posture of the bent conductive elastic body 30 can be easily kept unchanged. That is, as shown in FIG. 3A, in the initial state, the conductive elastic body 30 is easily maintained in a state where the conductive elastic body 30 is bent. Therefore, the capacitance can be more stably changed linearly according to the load.

Modifications

The configuration of the load sensor 1 can be modified in various ways other than the configuration shown in the above embodiment.

For example, in the above embodiment, as shown in FIG. 2A, the conductive elastic body 30 is bent in a spherical shape such that the center portion P1 thereof in the X-Y plane projects most in the Z-axis positive direction, but the bending shape of the conductive elastic body 30 is not limited thereto.

Figure 10A:
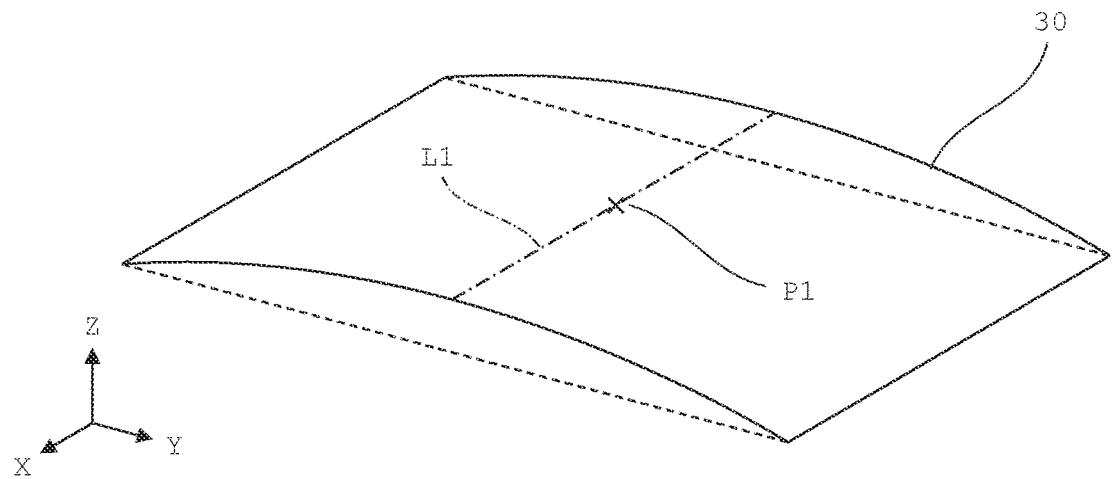
FIG. 10A is a perspective view schematically showing a conductive elastic body having a cylindrical surface-shaped bending shape according to a modification.

FIG. 10A is a perspective view schematically showing a modification in the case where the conductive elastic body 30 is bent only in the Y-axis direction in the X-Y plane, that is, in the case where the bending shape of the conductive elastic body 30 is a cylindrical surface shape (arch shape). In this case, the conductive elastic body 30 comes into contact with the lower surface 41 of the dielectric 40 in order from a straight line L1 which passes through the center portion P1 and which extends in the X-axis direction. The conductive elastic body 30 may be bent only in the X-axis direction in the X-Y plane.

In the above embodiment, the conductive elastic body 30 has only one bending shape that is bent in a spherical shape, but the number of bending shapes of the conductive elastic body 30 is not limited thereto.

Figure 10B:
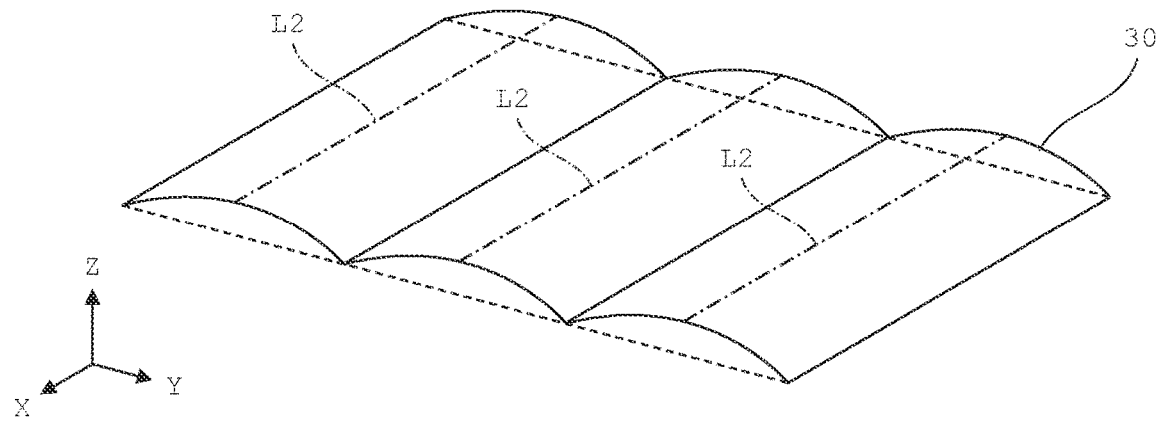
FIG. 10B is a perspective view schematically showing a conductive elastic body having a plurality of bending shapes according to a modification.

FIG. 10B is a perspective view schematically showing a modification in the case where the conductive elastic body 30 has a plurality of bending shapes that are bent in the up-down direction. In FIG. 10B, three bending shapes each of which is a cylindrical surface shape as shown in FIG. 10A are provided in the Y-axis direction. In this case, the conductive elastic body 30 comes into contact with the lower surface 41 of the dielectric 40 in order from a straight line L2 located at the top of each arch. The conductive elastic body 30 may have two bending shapes or four or more bending shapes, or may have a plurality of bending shapes each of which is bent in a spherical shape.

In the above embodiment, a bending shape is provided to the entire conductive elastic body 30, but the conductive elastic body 30 is not limited thereto, and a bending shape may be provided to only a part of the conductive elastic body 30.

Figure 10C:
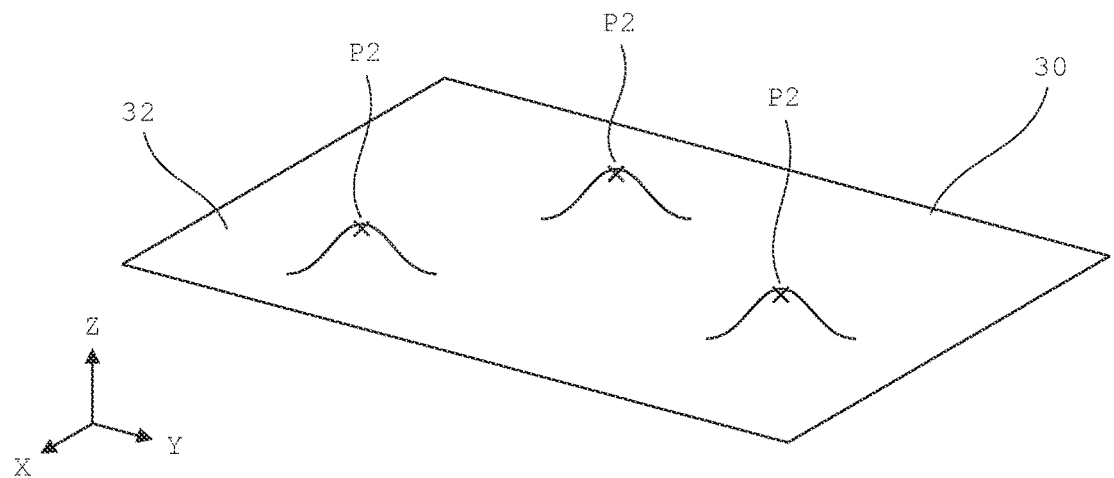
FIG. 10C is a perspective view schematically showing a conductive elastic body partially having bending shapes according to a modification.

FIG. 10C is a perspective view schematically showing a modification in the case where the conductive elastic body 30 is Partially bent in the up-down direction. In FIG. 10C, three bending shapes are provided on the upper surface 32 of the conductive elastic body 30 so as to project in the Z-axis positive direction. In this case, the conductive elastic body 30 comes into contact, with the lower surface 41 of the dielectric 40 in order from a top P2 of each bending shape.

The conductive elastic body 30 may partially have two bending shapes or four or more bending shapes.

In each of FIG. 10A to FIG. 10C, the contact range between the conductive elastic body 30 and the dielectric 40 gradually expands from the initial state, so that a sharp change in capacitance is suppressed. Therefore, the capacitance is easily changed linearly according to the load.

Figure 11A:
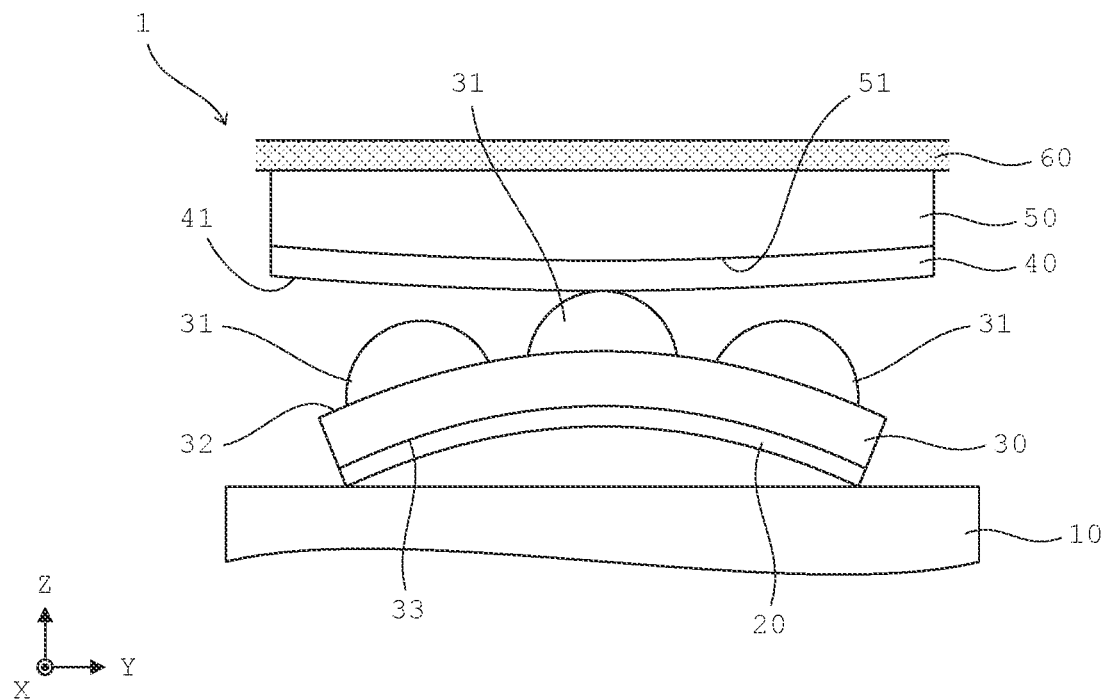
FIG. 11A is a side view schematically showing a state where the lower surface of an electrode and the lower surface of a dielectric are curved in the Z-axis negative direction, according to a modification.

In the above embodiment, the dielectric 40 is formed on the lower surface 51 of the electrode 50 such that the lower surface 41 is parallel to the X-Y plane. However, the dielectric 40 is not limited thereto, and may be formed on the lower surface 51 of the electrode 50 such that a center portion of the lower surface 41 projects in the Z-axis negative direction as shown in FIG. 11A. In the case where the dielectric 40 is formed on the lower surface 51 of the electrode 50 by vapor deposition or the like, as shown in FIG. 11A, the lower surface 41 of the dielectric 40 may be deformed in a spherical shape by raising the lower surface 51 of the electrode 50 in a spherical shape. Alternatively, the dielectric 40 may be provided on the lower surface 51 of the electrode 50, which is parallel to the X-Y plane, such that the lower surface 41 is raised in a spherical shape. Moreover, the lower surface 41 is not limited to one projecting in the Z-axis positive direction as shown in FIG. 11A, and may be recessed in the Z-axis negative direction. However, in this case, the dielectric 40 is formed on the lower surface 51 of the electrode 50 such that the curvature of the lower surface 41 is smaller than the curvature of the conductive elastic body 30.

By curving the lower surface 41 of the dielectric 40 in the up-down direction as described above, the process in which the projecting portions 31 come into contact with the dielectric 40 according to the load can be further adjusted. Accordingly, there is a possibility that the load range (dynamic range) where the capacitance can be changed linearly can be further expanded.

Figure 11B:
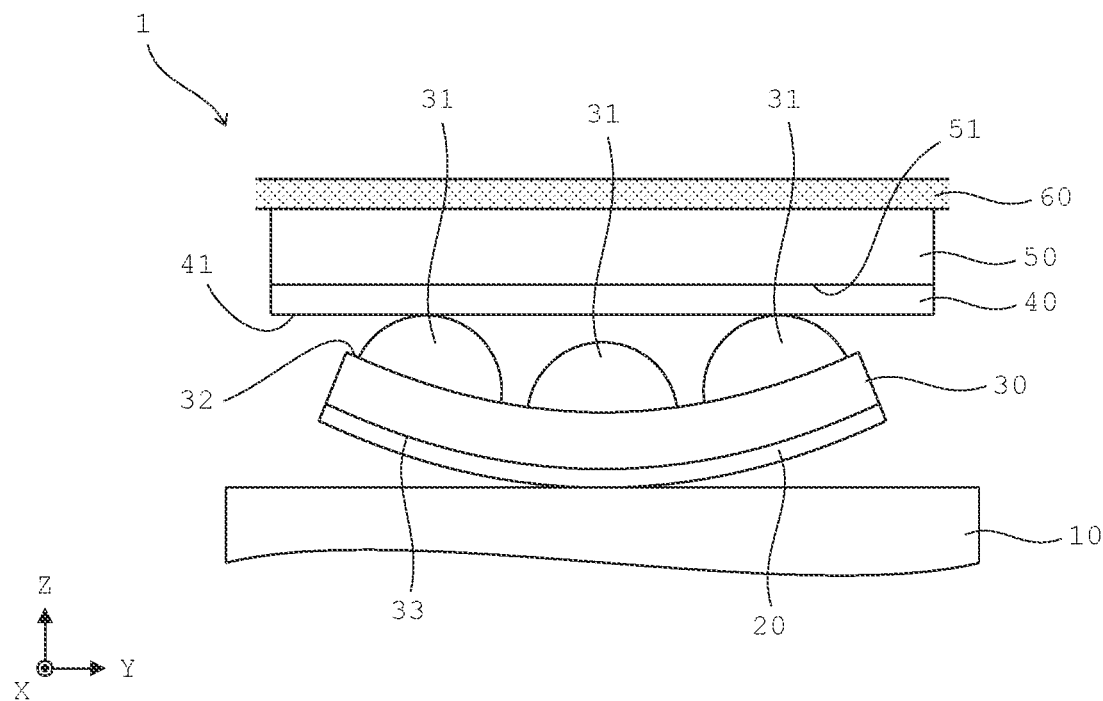
FIG. 11B is a side view schematically showing a state where a conductive elastic body and a metal plate are bent in the Z-axis negative direction, according to a modification.

In the above embodiment, as shown in FIG. 2A and FIG. 3A, the conductive elastic body 30 is disposed in a state where the conductive elastic body 30 is bent in a spherical shape in the Z-axis positive direction such that the center portion P1 thereof is closer to the dielectric 40 than the end portion thereof, but the bending direction of the conductive elastic body 30 is not limited thereto. For example, as shown in FIG. 11B, the conductive elastic body 30 may be disposed in a state where the conductive elastic body 30 is bent in a spherical shape in the Z-axis negative direction such that the end portion of the upper surface 32 is closer to the dielectric 40 than the center portion P1. In this case, the bending of the conductive elastic body 30 has a shape obtained by inverting the bending in FIG. 2A up and down.

However, if the bending direction of the conductive elastic body 30 is set as described above, when a load is applied from the initial state, the projecting portions 31 in a wide range located at the outer side of the conductive elastic body 30 simultaneously come into contact with the dielectric 40, so that the change in capacitance at the time of initial contact tends to be steep. Therefore, it is considered that, in order to make it easier to change the capacitance linearly according to the load, it is preferable that the bending direction of the conductive elastic body 30 is set to be the Z-axis positive direction and the center portion P1 thereof made closer to the dielectric 40 than the end portion thereof as in the above embodiment.

Figure 12A:
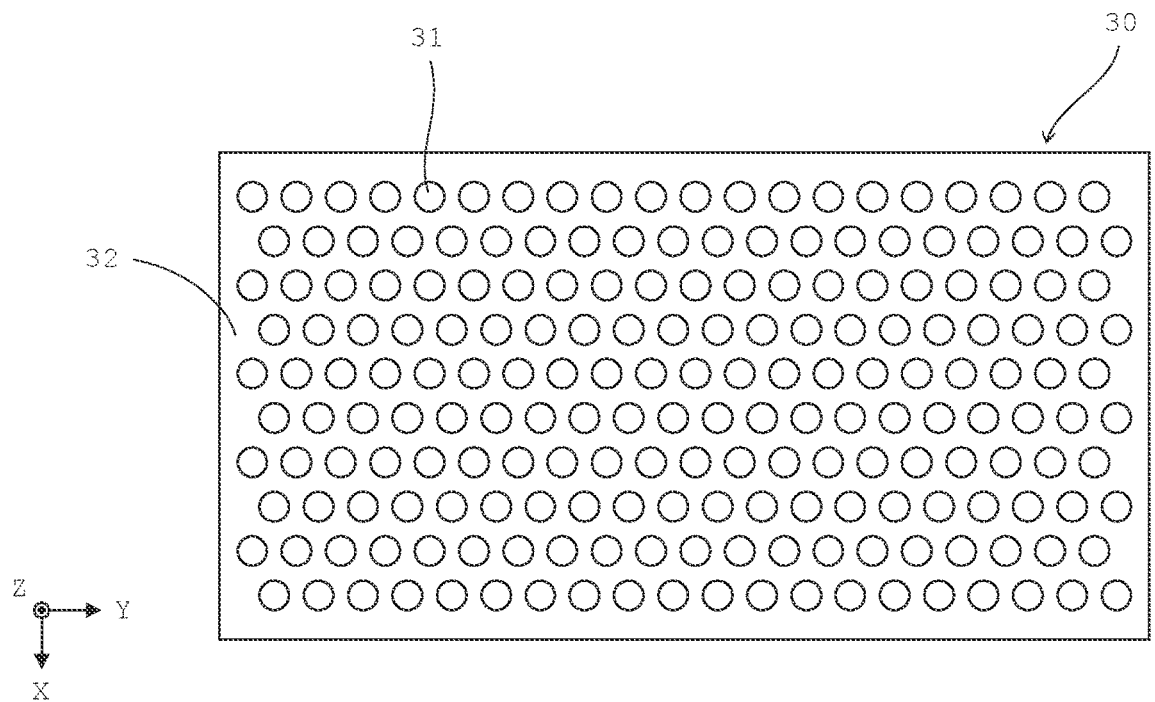
FIG. 12A is a top view schematically showing a configuration of a conductive elastic body having a plurality of projecting portions arranged in a honeycomb-like pattern, according to a modification.
Figure 12B:
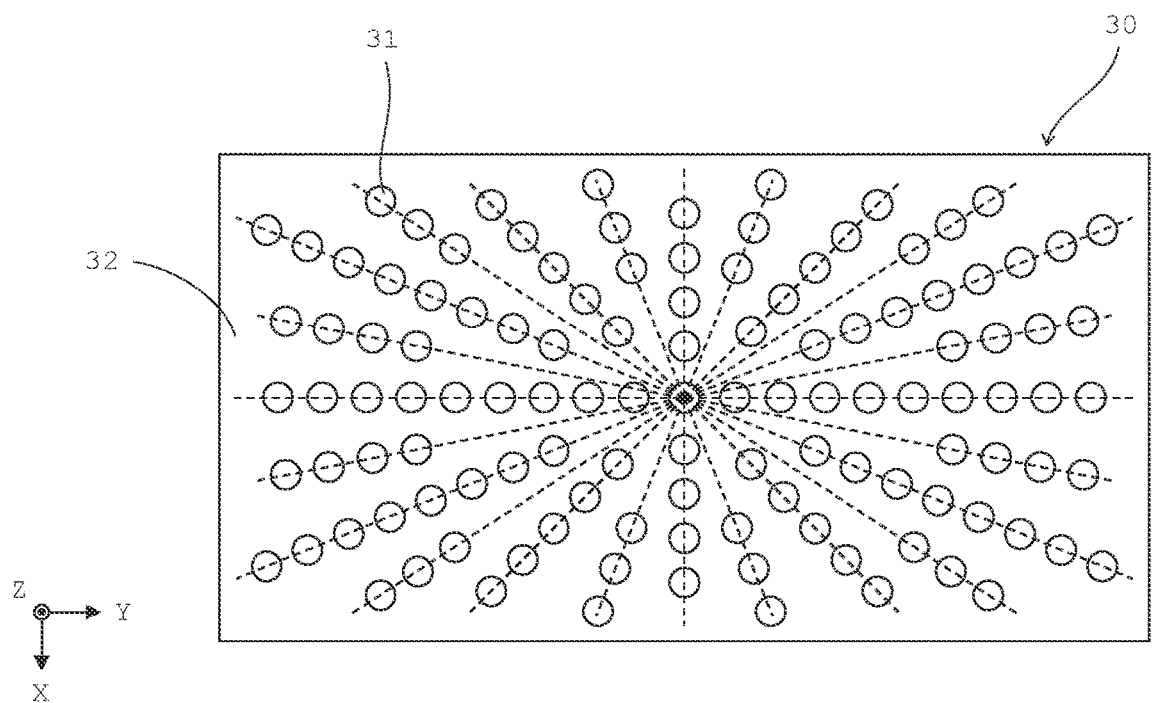
FIG. 12B is a top view schematically showing a configuration of a conductive elastic body having a plurality of projecting portions arranged in a radial pattern, according to a modification.

In the above embodiment, as shown in FIG. 5A, the plurality of projecting portions 31 are formed on the upper surface 32 so as to be arranged in a grid pattern along the K-axis direction and the Y-axis direction, but the arrangement of the plurality of projecting portions 31 is not limited thereto. For example, as shown in FIG. 12A, the plurality of projecting portions 31 may be arranged in a honeycomb-like pattern, that is, arranged such that projecting portions 31 adjacent to each other are located at intervals of 60° around one projecting portion 31. Alternatively, as shown in FIG. 12B, the projecting portions 31 may be arranged so as to be aligned along straight lines that extend radially from the center portion of the conductive elastic body 30 in the K-Y plane as shown by broken lines. Still alternatively, the density of the projecting portions 31 formed on the upper surface 32 does not have to be uniform as in the above embodiment, and the density of the projecting portions 31 on the upper surface 32 may be adjusted such that the change in capacitance with respect to the load is easily changed linearly.

Figure 13A:
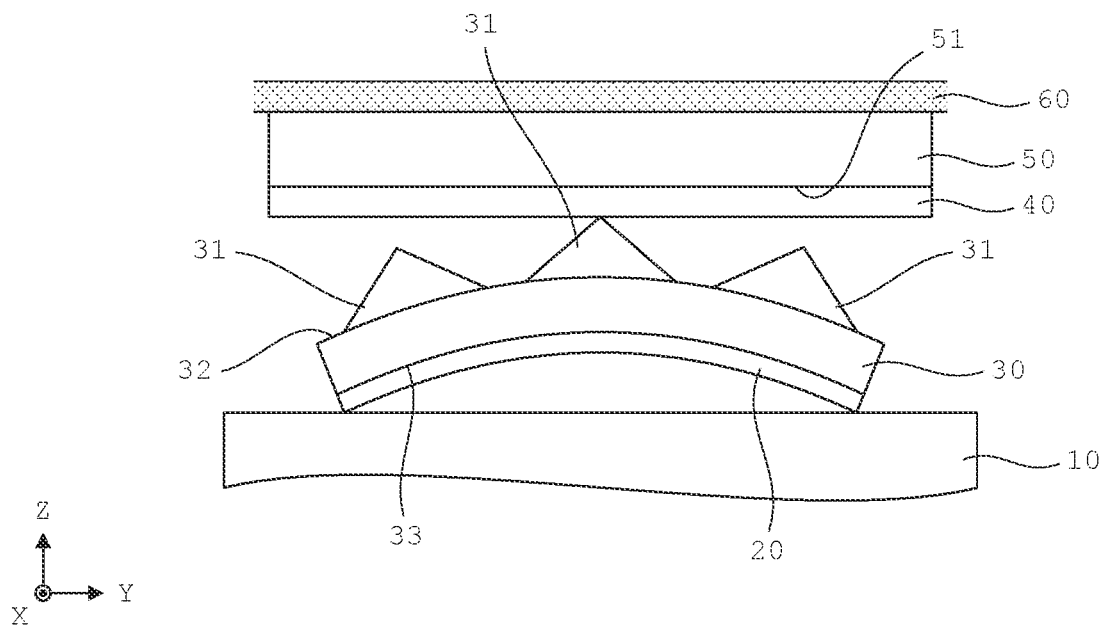
FIG. 13A is a side view schematically showing a configuration of projecting portions each having a circular cone shape, according to a modification.
Figure 13B:
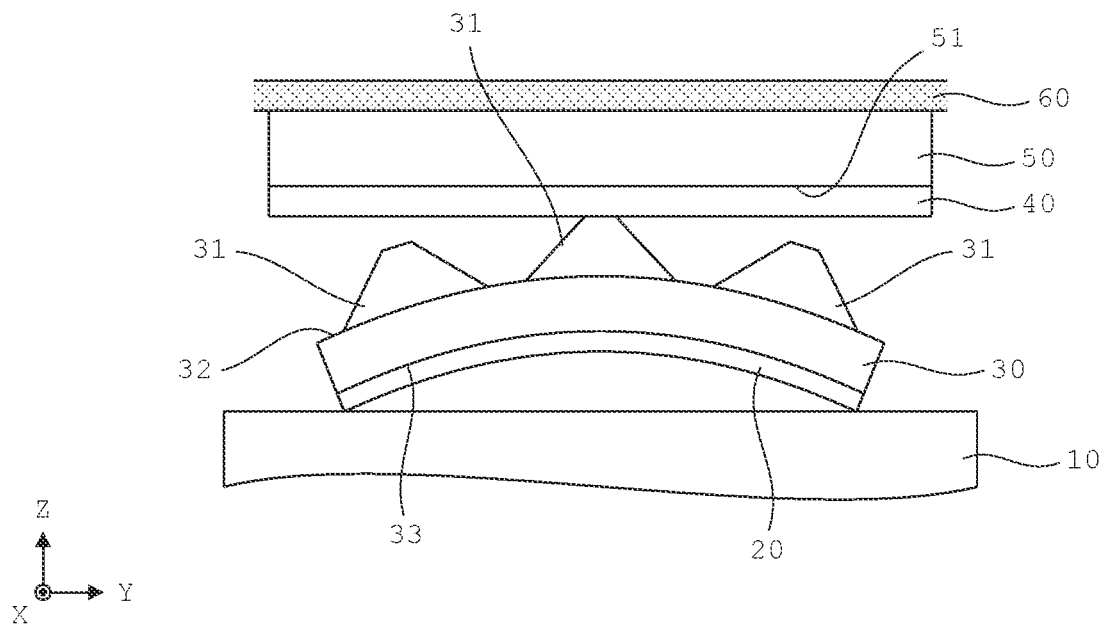
FIG. 13B is a side view schematically showing a configuration of projecting portions each having a quadrangular frustum shape, according to a modification.

In the above embodiment, each projecting portion 31 has a spherical shape, but is not limited thereto, and may have another shape as long as the cross-sectional area thereof becomes smaller with decreasing distance to the dielectric 40 (with advancement in the Z-axis positive direction). For example, each projecting portion 31 may have a cone shape. As shown in FIG. 13A, each projecting portion 31 may have a circular cone shape. In this case, each projecting portion 31 has a triangular shape with a pointed tip when viewed from the lateral side (in the X-axis direction and the Y-axis direction). Alternatively, each projecting portion 31 may have a pyramid shape. Still alternatively, each projecting portion 31 may have a shape in which the top of a cone is cut out, and may have, for example, a frustum shape. As shown in FIG. 13B, each projecting portion 31 may have a quadrangular frustum shape. In this case, each projecting portion 31 has a trapezoidal shape when viewed from the lateral side (in the X-axis direction and the Y-axis direction). Still alternatively, each projecting portion 31 may have a circular frustum shape.

Figure 14A:
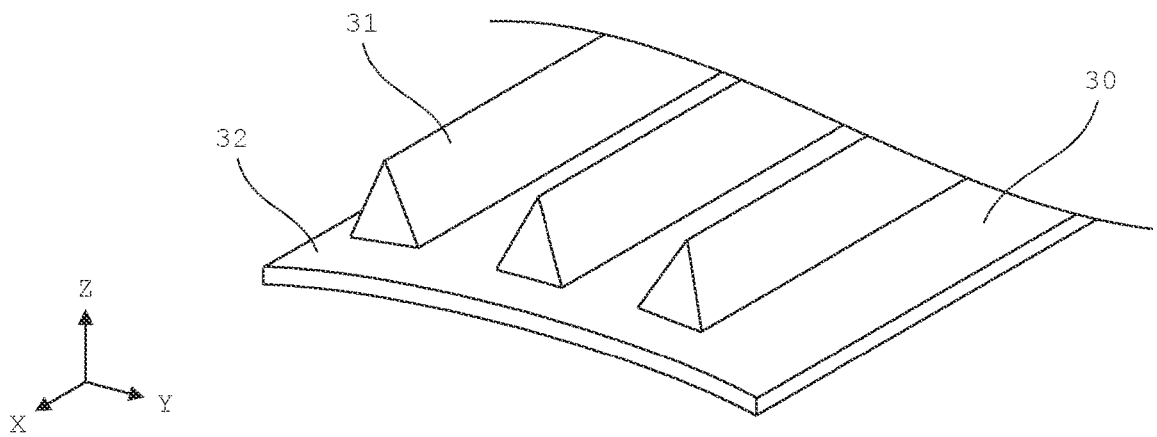
FIG. 14A to FIG. 14C are each a perspective view schematically showing a configuration of projecting portions each having a ridge shape, according to a modification.
Figure 14B:
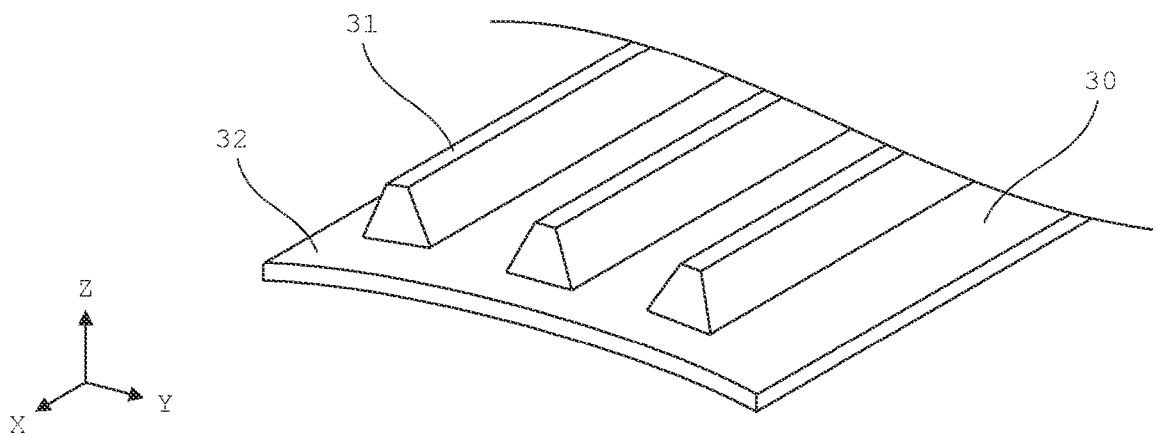
Figure 14C:
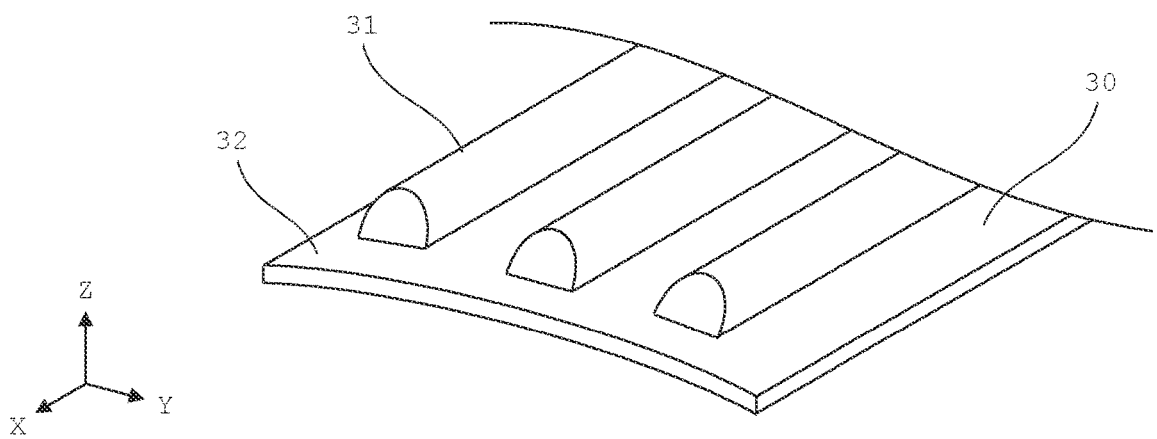

Still alternatively, each projecting portion 31 may have a ridge shape extending in one direction in the X-Y plane as shown in FIG. 14A to FIG. 14C. In FIG. 14A to FIG. 14C, for convenience, three projecting portions 31 each having a ridge shape are shown to be aligned in the Y-axis direction, and are illustrated such that the scale thereof in the Z-axis direction is larger.

As shown in FIG. 14A, each projecting portion 31 may have a ridge shape that is a triangular shape when viewed in the X-axis direction and that is a trapezoidal shape with an end on the Z-axis positive side having a predetermined length in the Y-axis direction when viewed in the Y-axis direction. Alternatively, as shown in FIG. 14B, each projecting portion 31 may have a ridge shape that is a trapezoidal shape when viewed in the X-axis direction and that is a trapezoidal shape with an end on the Z-axis positive side having a predetermined length in the Y-axis direction when viewed in the Y-axis direction. Still alternatively, as shown in FIG. 14C, each projecting portion 31 may have a ridge shape that is a semicircular shape when viewed in the X-axis direction and that is a trapezoidal shape with an end on the Z-axis positive side having a predetermined length in the Y-axis direction when viewed in the Y-axis direction.

In FIG. 14A to FIG. 14C, the conductive elastic body 30 is bent only in the Y-axis direction in the X-Y plane, but is not limited thereto, and may be bent only in the X-axis direction in the X-Y plane, or may be bent in a spherical shape as in the above embodiment.

In the above embodiment, when the lower surface 41 of the dielectric 40 comes into contact with all the projecting portions 31, the bending of the conductive elastic body 30 is eliminated. However, the conductive elastic body 30 is not limited thereto, and may still be bent when the lower surface 41 of the dielectric 40 comes into contact with all the projecting portions 31.

In the above embodiment, the conductive elastic body 30 and the metal plate 20 are integrally molded, but the metal plate 20 may be omitted as long as the posture of the conductive elastic body 30 in the load sensor 1 in the initial state can be kept unchanged in the bent state. In addition, in the case where the metal plate 20 is omitted, an elastic member having an elastic force may be disposed in the gap between the conductive elastic body 30 and the substrate 10.

In the above embodiment, each of the outer shape of the conductive elastic body 30 and the shape of the arrangement range of the plurality of projecting portions 31 is a rectangular shape in the X-Y plane, but is not limited thereto, and may be a square shape or may be a circular or elliptical shape in the X-Y plane.

In the above embodiment, one conductive elastic body 30 is disposed for one electrode 50, but the present invention is not limited thereto, and, for one electrode 50, two or more conductive elastic bodies 30 may be arranged side by side so as to be spaced apart from each other at a predetermined interval in the X-Y plane.

Figure 15:
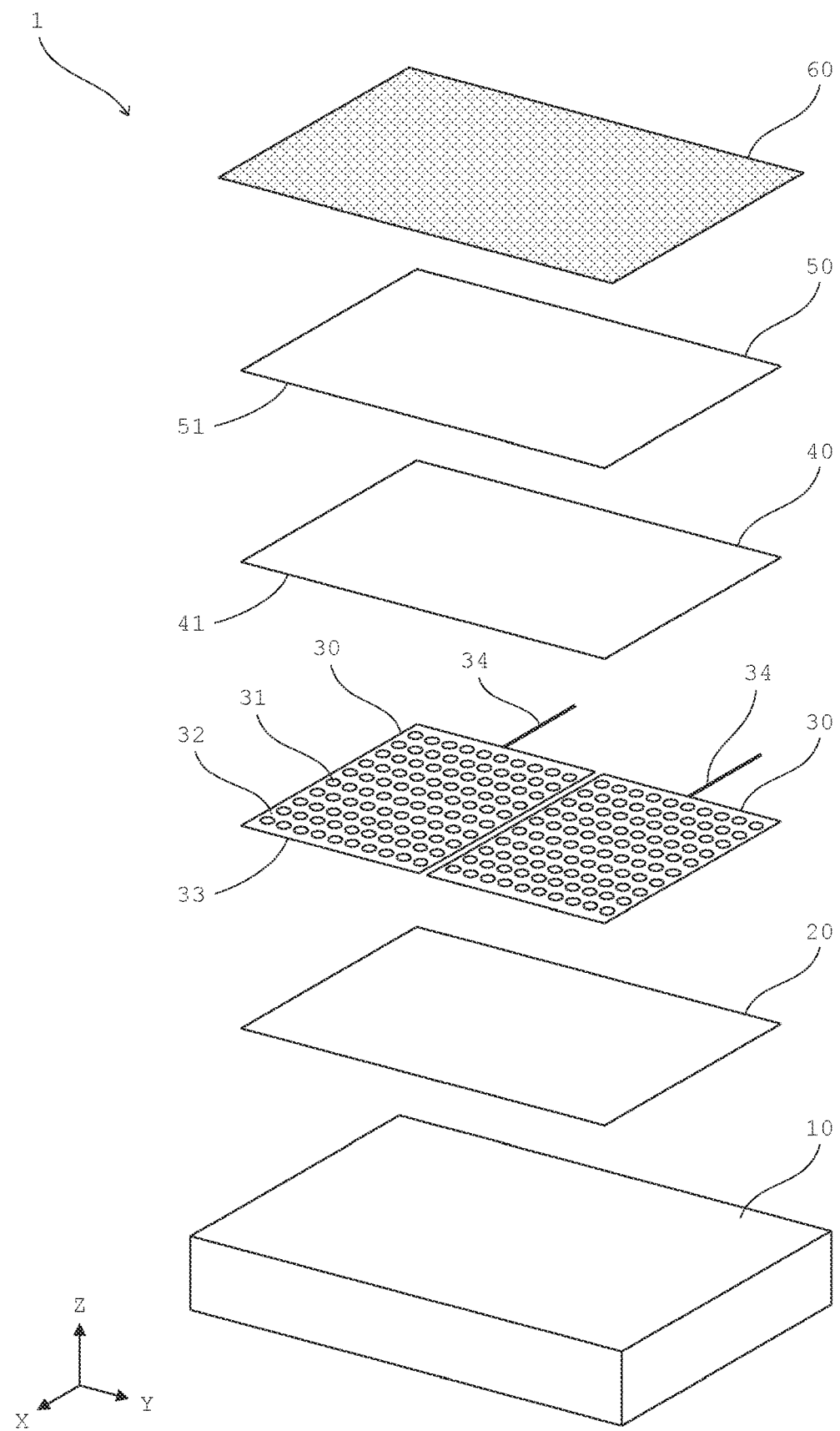
FIG. 15 is an exploded perspective view schematically showing a configuration of a load sensor in which two conductive elastic bodies are disposed, according to a modification.

FIG. 15 is an exploded perspective view schematically showing a modification in which, for one electrode 50, two conductive elastic bodies 30 are arranged side by side in the Y-axis direction so as to be spaced apart from each other at a predetermined interval. In this case, a conducting wire 34 is provided to each conductive elastic body 30, and connected to a device external to the load sensor 1. The external device detects changes in capacitances based on the two respective conductive elastic bodies 30, and detects a change in total capacitance by adding the obtained two capacitances. Then, the external device detects the load applied to the load sensor 1 on the basis of the change in total capacitance.

In the above embodiment, as shown in FIG. 2A and FIG. 3A, the metal plate 20 and the conductive elastic body 30 are disposed in a state where the center portion thereof is bent in a spherical shape in the Z-axis positive direction with respect to the end portion thereof, and the dielectric 40 and the electrode 50 are disposed so as to be parallel to the X-Y plane. However, the present invention is not limited thereto, and, as shown in FIG. 16A, the metal plate 20 and the conductive elastic body 30 may be disposed so as to be parallel to the X-Y plane, and the dielectric 40 and the electrode 50 may be disposed in a state where the center portion thereof is bent in a spherical shape in the Z-axis negative direction with respect to the end portion thereof.

Figure 16A:
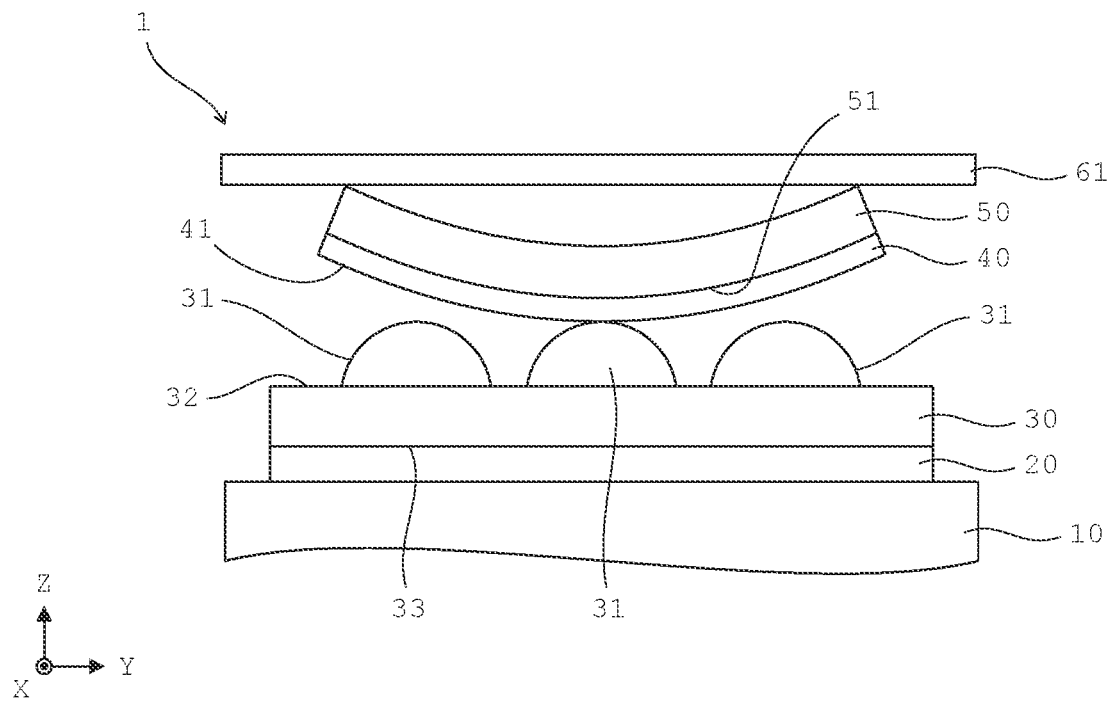
FIG. 16A is a side view schematically showing a state where a metal plate and a conductive elastic body are parallel to an X-Y plane and a dielectric and an electrode have a bending shape, according to a modification.
Figure 16B:
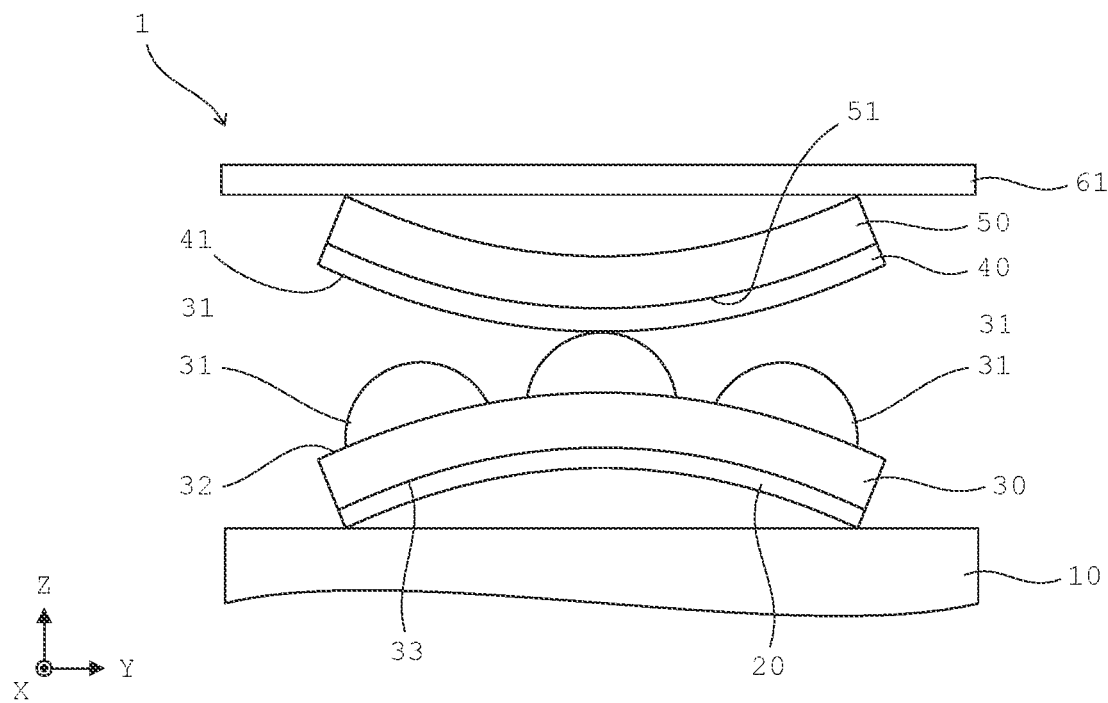
FIG. 16B is a side view schematically showing a state where a metal plate and a conductive elastic body and a dielectric and an electrode have bending shapes, according to a modification.

Still alternatively, as shown in FIG. 16B, the metal plate 20 and the conductive elastic body 30 may be disposed in a state where the center portion thereof is bent in a spherical shape in the Z-axis positive direction with respect to the end portion thereof, and the dielectric 40 and the electrode 50 may also be disposed in a state where the center portion thereof is bent in a spherical shape in the Z-axis negative direction with respect to the end portion thereof. That is, the metal plate 20 and the conductive elastic body 30, and the dielectric 40 and the electrode 50 may have bending shapes that are bent in directions approaching each other.

In the configurations of FIG. 16A and FIG. 16B, the cover 60 is omitted, and a substrate 61 which is made of the same material as the substrate 10 and which has a predetermined thickness is disposed on the Z-axis positive side of the electrode 50.

In each of the cases of FIG. 16A and FIG. 16B, similar to the above embodiment, by changing the number of the projecting portions 31 that come into contact with the dielectric 40, the contact area between each projecting portion 31 and the dielectric 40, and the distance between the dielectric 40 and the conductive elastic body 30, the capacitance of the capacitor formed by the electrode 50, the dielectric 40, and the conductive elastic body 30 can be changed linearly in a wide load range. Accordingly, a load can be detected through simple processing in a wide dynamic range. Therefore, a load can be detected through simple processing while ensuring a wide dynamic range.

In the configuration of FIG. 16B, since both the metal plate 20 and the conductive elastic body 30 on the lower side and the dielectric 40 and the electrode 50 on the upper side are bent according to the load, the process in which the projecting portions 31 come into contact with the dielectric 40 according to the load can be further adjusted. Accordingly, there is a possibility that the load range (dynamic range) where the capacitance can be changed linearly can be further expanded.

Figure 17A:
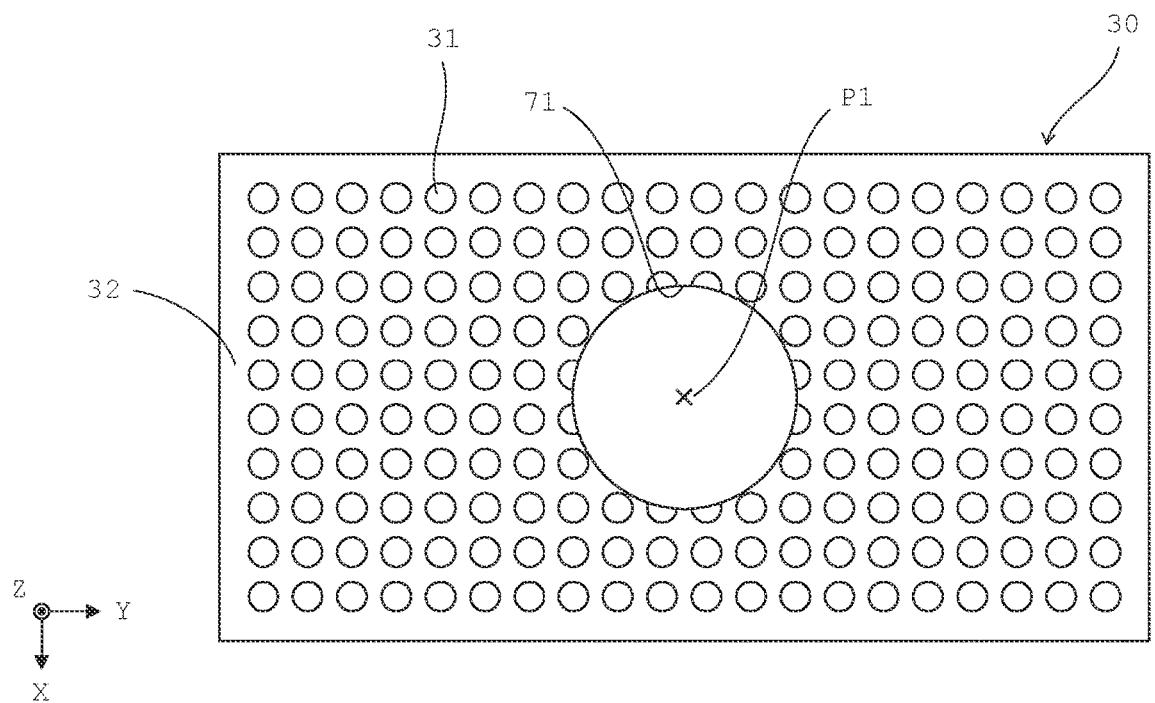
FIG. 17A is a top view schematically showing a conductive elastic body and an opening, as viewed in the Z-axis negative direction, according to a modification.
Figure 17B:
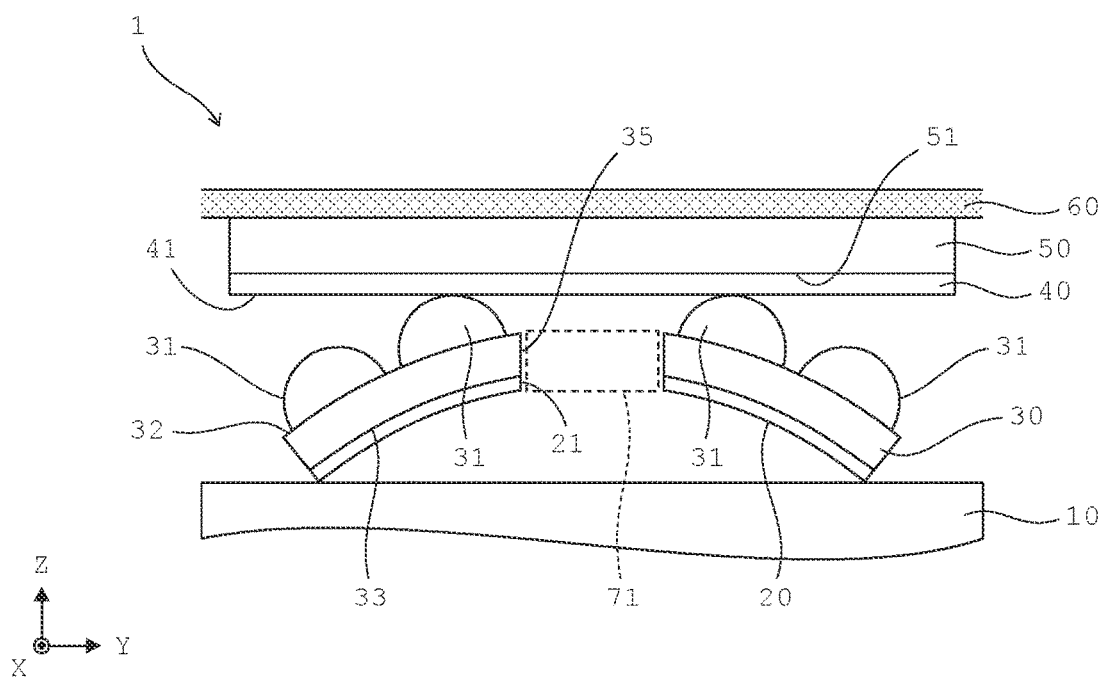
FIG. 17B is a side view schematically showing an opening formed in a metal plate and a conductive elastic body, according to a modification.

In the above embodiment, as shown in FIG. 17A and FIG. 17B, an opening 71 may be formed at the center portion 51 of the conductive elastic body 30. The opening 71 has a circular shape when viewed in the Z-axis direction as shown in FIG. 17A, and penetrates the metal plate 20 and the conductive elastic body 30 in the Z-axis direction as shown in FIG. 17B.

When forming the opening 71, the metal plate 20 having a hole 21 (see FIG. 17B) formed at the center portion thereof is inserted into a mold in advance, and the material of the conductive elastic body 30 is injected thereinto. Then, similar to the above embodiment, an integrated structure of the metal plate 20 and the conductive elastic body 30 is produced by a molding method for integrating the metal and the resin, and in a cooling process after molding, a shape in which the circumferential portion of the opening 71 is bent with respect to an end portion is formed due to the difference in expansion rate between the metal plate 20 and the conductive elastic body 30.

At this time, since the hole 21 is formed at the center portion of the metal plate 20, a hole 35 (see FIG. 17B) is formed at the center portion of the conductive elastic body 30. When the hole 35 is formed at the center portion of the conductive elastic body 30 as described above, the conductive elastic body 30 is inhibited from being formed so as to be raised at and near the center of the metal plate 20 in the cooling process.

That is, in the case where, as in the above embodiment, the hole 21 is not formed at and near the center of the metal plate 20 and the conductive elastic body 30 is also formed at the portion of the opening 71 shown in FIG. 17A, the amount of warpage of the metal plate 20 and the conductive elastic body 30 at the center (length from the upper surface of the substrate 10 to the lower end of the opening 71) may be varied due to the variation in expansion of the conductive elastic body 30 at this portion. On the other hand, in the configurations of FIG. 17A and FIG. 17B, since the conductive elastic body 30 is not formed at and near the center of the metal plate 20, occurrence of variation in the amount of warpage of the metal plate 20 and the conductive elastic body at the center can be suppressed in the cooling process. Accordingly, occurrence of variation in the change in capacitance corresponding to a change in load can be suppressed.

Also, in the modifications shown in FIG. 17A and FIG. 17B, similar to the above embodiment, by changing the number of the projecting portions 31 that come into contact with the dielectric 40, the contact area between each projecting portion 31 and the dielectric 40, and the distance between the dielectric 40 and the conductive elastic body 30, the capacitance of the capacitor formed by the electrode 50, the dielectric 40, and the conductive elastic body 30 can be changed linearly in a wide load range. Accordingly, a load can be detected through simple processing in a wide dynamic range. Therefore, a load can be detected through simple processing while ensuring a wide dynamic range. In addition, since the variation in the amount of warpage of the metal plate 20 and the conductive elastic body 30 at the center is suppressed, a desired dynamic range can be realized.

Figure 18A:
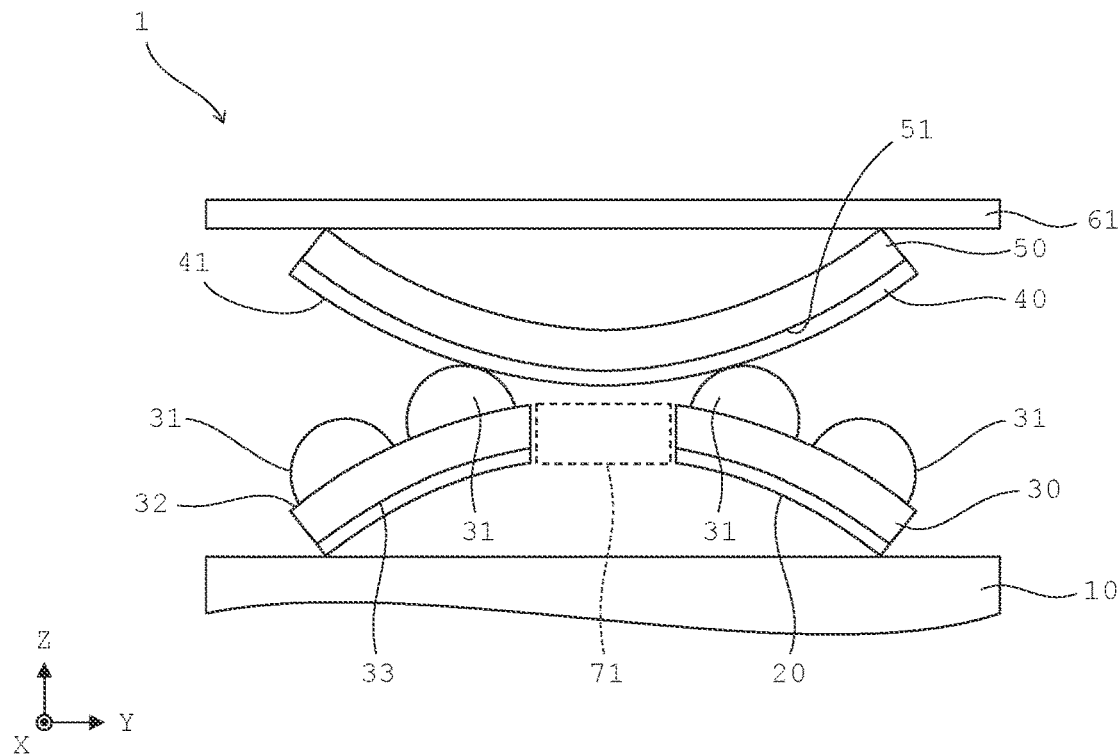
FIG. 18A is a side view schematically showing an opening formed in a metal plate and a conductive elastic body in the case where a metal plate and a conductive elastic body and a dielectric and an electrode have bending shapes that are bent in directions approaching each other, according to a modification.
Figure 18B:
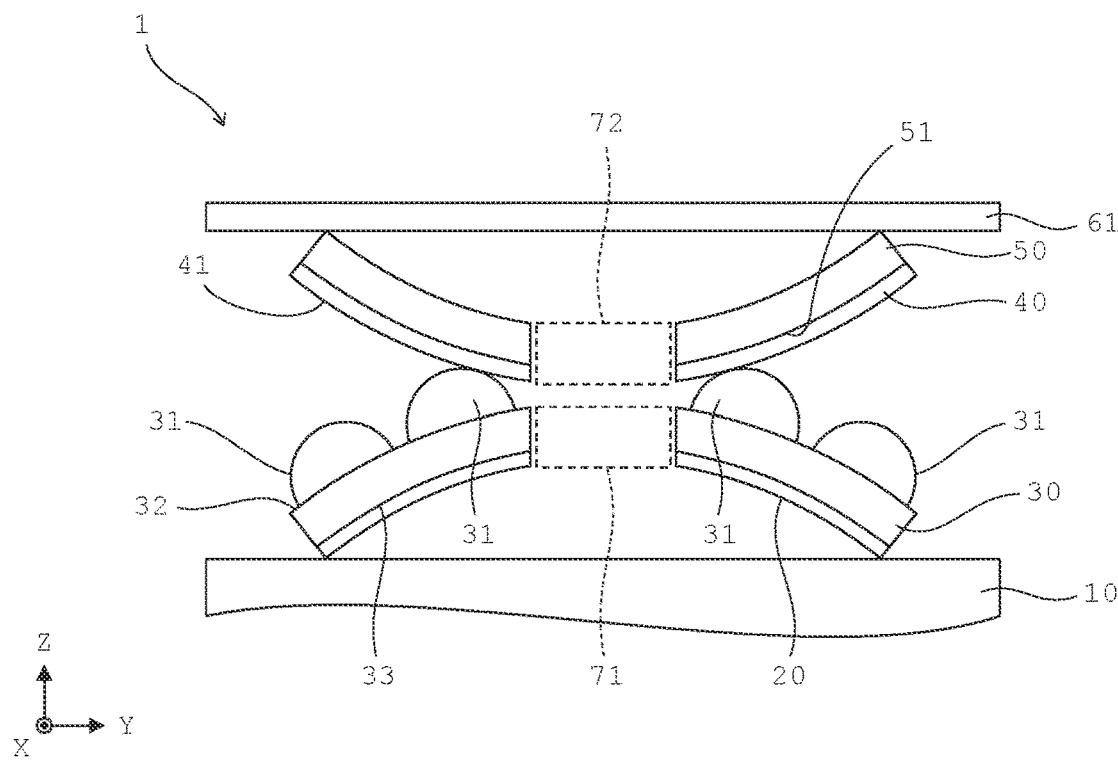
FIG. 18B is a side view schematically showing openings formed in a metal plate and a conductive elastic body and in a dielectric and an electrode in the case where the metal plate and the conductive elastic body and the dielectric and the electrode have bending shapes that are bent in directions approaching each other, according to a modification.

Also, in the case where the metal plate 20 and the conductive elastic body 30, and the dielectric 40 and the electrode 50 have bending shapes that are bent in directions approaching each other as shown in FIG. 18A, the opening 71 may be formed at the center portion P1 of the conductive elastic body 30. In this case, as shown in FIG. 18B, an opening 72 may also be formed at the center portion of the dielectric 40 and the electrode 50.

In the modifications shown in FIG. 17A to FIG. 18B, the openings 71 and 72 each have a circular shape when viewed in the Z-axis direction, but are not limited thereto, and may each have another shape such as an elliptical shape and a rectangular shape. In addition, the opening 71 is provided in a range (center portion) including the centers of the metal plate 20 and the conductive elastic body 30, but is not limited thereto, and may be provided at a portion of the conductive elastic body 30 that projects most in the Z-axis positive direction. Similarly, the opening 72 is provided in the range (center portion) including the centers of the dielectric 40 and the electrode 50, but is not limited thereto, and may be provided at a portion of the dielectric 40 that projects most in the Z-axis negative direction. In addition, in the modification shown in FIG. 11B as well, the opening 71 may be formed at the center portion P1 of the conductive elastic body 30.

In addition to the above, various modifications can be made as appropriate to the embodiments of the present invention, without departing from the scope of the technological idea defined by the claims.

What is claimed is:

1. A load sensor comprising:
   an electrode;
   a dielectric formed on a lower surface of the electrode; and
   an elastic body disposed so as to face a lower surface of the dielectric and having conductivity, wherein
   a plurality of projecting portions are formed on an upper surface of the elastic body, and
   the elastic body has a bending shape that is bent in an up-down direction, in at least a part thereof.

2. The load sensor according to claim 1, wherein the bending shape is bent such that a center portion thereof is closer to the dielectric than an end portion thereof.

3. The load sensor according to claim 1, wherein the bending shape is bent such that an end portion thereof is closer to the dielectric than a center portion thereof.

4. The load sensor according to claim 2, wherein the bending shape is bent in a spherical shape.

5. The load sensor according to claim 1, wherein the bending shape is bent in a cylindrical surface shape.

6. The load sensor according to claim 1, wherein the elastic body has a plurality of the bending shapes.

7. The load sensor according to claim 1, wherein an entirety of the elastic body is bent in the up-down direction.

8. The load sensor according to claim 1, wherein the lower surface of the dielectric is curved in the up-down direction.

9. The load sensor according to claim 1, wherein the plurality of projecting portions are formed on the upper surface of the elastic body so as to be arranged in a grid pattern.

10. The load sensor according to claim 1, wherein the plurality of projecting portions are formed on the upper surface of the elastic body so as to be arranged in a honeycomb-like pattern.

11. The load sensor according to claim 1, wherein the plurality of projecting portions are formed on the upper surface of the elastic body so as to be arranged in a radial pattern.

12. The load sensor according to claim 1, wherein the projecting portions each have a cross-sectional area that decreases with decreasing distance to the dielectric.

13. The load sensor according to claim 12, wherein the projecting portion has a spherical shape.

14. The load sensor according to claim 12, wherein the projecting portion has a cone shape.

15. The load sensor according to claim 12, wherein the projecting portion has a frustum shape.

16. The load sensor according to claim 12, wherein the projecting portion has a ridge shape.

17. The load sensor according to claim 1, wherein the load sensor includes a plurality of the elastic bodies arranged side by side so as to be spaced apart from each other at a predetermined interval.

18. The load sensor according to claim 1, wherein a thin metal plate for defining bending of the elastic body is provided on a lower surface of the elastic body.

19. The load sensor according to claim 1, wherein an opening is provided at a center portion of the bending shape.

20. A load sensor comprising:
    an electrode;
    a dielectric formed on a lower surface of the electrode; and
    an elastic body disposed so as to face a lower surface of the dielectric and having conductivity, wherein
    a plurality of projecting portions are formed on an upper surface of the elastic body, and
    at least either the elastic body or the electrode has a bending shape that is bent in an up-down direction, in at least a part thereof.

* * * * *